(12) United States Patent
Oda et al.

(10) Patent No.: US 8,451,470 B2
(45) Date of Patent: May 28, 2013

(54) PRINT CONTROL APPARATUS AND PRINTING APPARATUS

(75) Inventors: Akihiko Oda, Hino (JP); Takeshi Nakajima, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 621 days.

(21) Appl. No.: 12/715,091

(22) Filed: Mar. 1, 2010

(65) Prior Publication Data

US 2010/0231963 A1 Sep. 16, 2010

(30) Foreign Application Priority Data

Mar. 16, 2009 (JP) ................................. 2009-062374

(51) Int. Cl.
*G06K 15/00* (2006.01)
*G06F 3/12* (2006.01)

(52) U.S. Cl.
USPC .......................... 358/1.14; 358/1.13; 358/1.15

(58) Field of Classification Search
None
See application file for complete search history.

(56) References Cited

U.S. PATENT DOCUMENTS

2003/0030836 A1* 2/2003 Maekawa ...................... 358/1.14

FOREIGN PATENT DOCUMENTS

| JP | 11-224168 | 8/1999 |
|---|---|---|
| JP | 2003-122526 | 4/2003 |
| JP | 2006-197053 | 7/2006 |

OTHER PUBLICATIONS

Japanese Notice of Reasons for Refusal issued by JPO on Nov. 24, 2010, in connection with Appl. No. 2009-062374, 3 pgs.
Translation of Japanese Notice of Reasons for Refusal issued by JPO on Nov. 24, 2010, in connection with Appl. No. 2009-062374, 3 pgs.

* cited by examiner

*Primary Examiner* — Dov Popovici
(74) *Attorney, Agent, or Firm* — Squire Sanders (US) LLP

(57) ABSTRACT

A print control apparatus that makes it possible to conduct the print controlling operations in the interruption printing mode, so as to optimize the beneficial balance between the interrupting side and the interrupted side. The apparatus includes a job-status parameter acquiring section to acquire job-status parameters including a residual printing time of the first print job, a printing time of the second print job, a first priority degree representing an implementation priority of the first print job and a second priority degree representing another implementation priority of the second print job and a controlling section to determine whether or not the interruption printing operation should be allowed, namely, an availability of the interruption printing operation, based on the residual printing time of the first print job, the printing time of the second print job, and at least one of the first priority degree and the second priority degree.

22 Claims, 14 Drawing Sheets

PRINT CONTROL APPARATUS AND PRINTING APPARATUS

This application is based on Japanese Patent Application No. 2009-062374 filed on Mar. 16, 2009, with Japan Patent Office, the entire content of which is hereby incorporated by reference.

BACKGROUND OF THE INVENTION

The present invention relates to a print control apparatus and a printing apparatus, and specifically relates to such a print control apparatus and a printing apparatus that conduct operations for determining availability of an interruption printing and controlling the interruption printing in which another printing operation is implemented while making a currently conducted printing operation suspended.

With respect to the printing apparatus that is provided with a copying function, a printing function, etc., there has been well known an interruption printing function to be employed in such a case that another printing operation is wished to be implemented immediately in mid course of performing a certain printing operation or the like, so as to meet the needs of the user. According to this interruption printing function, when an "interruption button" is depressed, the printing apparatus accepts the interruption of the other printing operation by suspending the currently performing printing operation, and the concerned interruption printing is completed, the printing apparatus resume the printing operation temporarily suspended.

When the user who intends to interrupt the current printing operation is different from the other use who is to be interrupted, it is beneficial for the interrupting user since his own printing operation can be preferentially implemented, while the interrupted user is liable to suffer from such a unbeneficial fact that the preceding printing operation of his own ends up on the back-burner and as a result, the completion time is extended. Specifically, if a long-time consuming printing operation interrupts the printing operation currently implemented by the interrupted user, sometimes the time for waiting the completion of his own printing operation possibly becomes long, resulting in increase of detriment (loss time). However, On the other hand, when the interrupting user intends to make a relatively short-time printing operation having a high emergency degree (high priority) interrupt into the long-time consuming printing operation currently implemented, there has been such an advantage that the interrupting user can gain a privilege of this function.

Accordingly, it is desirable that the operations for controlling and determining availability of the interruption printing are implemented so as to optimize the beneficial balance between the interrupted user and the interrupting user. In order to achieve the abovementioned optimization, it is necessary to take into account such factors that includes a residual printing time to be consumed until the printing operation of the interrupted user is completed, a printing time to be consumed by the interrupting user, which directly relates to the detriment (loss time) of the interrupted user, and a degree of priority indicating whether the priority is given to the interrupting user or the interrupted user (degree of importance representing which is more important than the other), and it is desirable that the abovementioned optimization is comprehensively determined from the factors above-mentioned.

For instance, Tokkai 2006-197053 (Japanese Patent Application Laid-Open Publication) sets forth such a technology that, in order to improve the detriment of the interrupted user, it is determined whether or not a new print job, newly inputted from the user's terminal device in mid course of implementing the current print job, is established as an urgent print job, and when determining that the new print job is established as the urgent print job, the number of paper sheets to be printed in the urgent print job is compared with the number of the residual paper sheets to be printed in the preceding print job, so as to conduct the controlling operation for banning the interrupting operation of the urgent print job.

Further, Tokkaihei 11-224168 (Japanese Patent Application Laid-Open Publication) sets forth such a technology that, in the printing operation based on image data received via a facsimile or a print instruction and stored in a storage, in order to efficiently print documents having a high priority at a high efficiency rate, even in mid course of the mass printing operation, when the interruption conditions (upper limit of specified number of pages/upper limit of specified amount of data/upper limit of specified time, which are set by the user setting with respect to the preceding print job) for the preceding print job (image data for the printing operation being currently implemented) are fulfilled, the operation for determining whether or not the interruption printing should be implemented (determination of priority degrees of the preceding print job and the standby print job) is conducted on the basis of the priority attribute information (total number of pages to be printed, total amount of print data, user's information, etc., which are set by the user setting) that specifies the priority of the standby print job (image data that waits the printing operation).

According to the technology set forth in Tokkai 2006-197053, the availability of the interruption printing is determined only by employing the number of paper sheets to be printed. However, such the determination that is made by only a single factor as abovementioned has not been sufficient for optimizing the beneficial balance between the interrupted user and the interrupting user.

Further, according to the technology set forth in Tokkaihei 11-224168, the availability of the interruption printing is determined by employing the number of pages to be printed and the amount of print data in the standby print job. However, even in this technology, since the determination is made by each of the factors in the result, this technology has been also insufficient for optimizing the beneficial balance between the interrupted user and the interrupting user.

In order to optimize the abovementioned beneficial balance, it is necessary to take into account the quantitative factors, such as printing times of both the interrupted user side and the interrupting user side, and the qualitative factors, such as the priority degrees (importance degrees) of both of them, and it is desirable that the availability of the interruption printing is determined by employing such the complex factors.

Further, the conventional printing apparatus has been so constituted that the manual interruption printing function is activated by depressing an exclusive interruption button. Accordingly, the interruption printing function has been liable not to be used, unless the recognition degree of this function itself or the other recognition degree of its operational method is made to rise. Therefore, there has been still some room for improving the maneuverability of this function.

SUMMARY OF THE INVENTION

To overcome the abovementioned drawbacks in conventional printing apparatus, it is one of objects of the present invention to provide a print control apparatus and a printing apparatus, each of which makes it possible to conduct the print controlling operations in the interruption printing mode, so as to optimize the beneficial balance between the interrupting side and the interrupted side.

Accordingly, at least one of the objects of the present invention can be attained by any one of the print control apparatuses and the printing apparatuses described as follows.

According to a print control apparatus reflecting an aspect of the present invention, the print control apparatus that controls an interruption printing operation, to be performed by a printing section, for temporarily suspending a first print job that is currently in midcourse of its implementation so as to implement a second job in an interruption printing mode, comprises: a job-status parameter acquiring section to acquire job-status parameters including a residual printing time of the first print job, a printing time of the second print job, a first priority degree representing an implementation priority of the first print job and a second priority degree representing another implementation priority of the second print job; and a controlling section to determine whether or not the interruption printing operation should be allowed, namely, an availability of the interruption printing operation, based on the residual printing time of the first print job, the printing time of the second print job, and at least one of the first priority degree and the second priority degree.

According to a printing apparatus reflecting still another aspect of the present invention, the printing apparatus comprises: a printing section to perform an interruption printing operation for temporarily suspending a first print job that is currently in midcourse of its implementation so as to implement a second job in an interruption printing mode; a job-status parameter acquiring section to acquire job-status parameters including a residual printing time of the first print job, a printing time of the second print job, a first priority degree representing an implementation priority of the first print job and a second priority degree representing another implementation priority of the second print job; and a controlling section to determine whether or not the interruption printing operation should be allowed, namely, an availability of the interruption printing operation, based on the residual printing time of the first print job, the printing time of the second print job, and at least one of the first priority degree and the second priority degree; wherein the controlling section controls a printing operation for recording an image onto a recording paper sheet based on image data representing the image, the printing operation is to be performed by the printing section.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
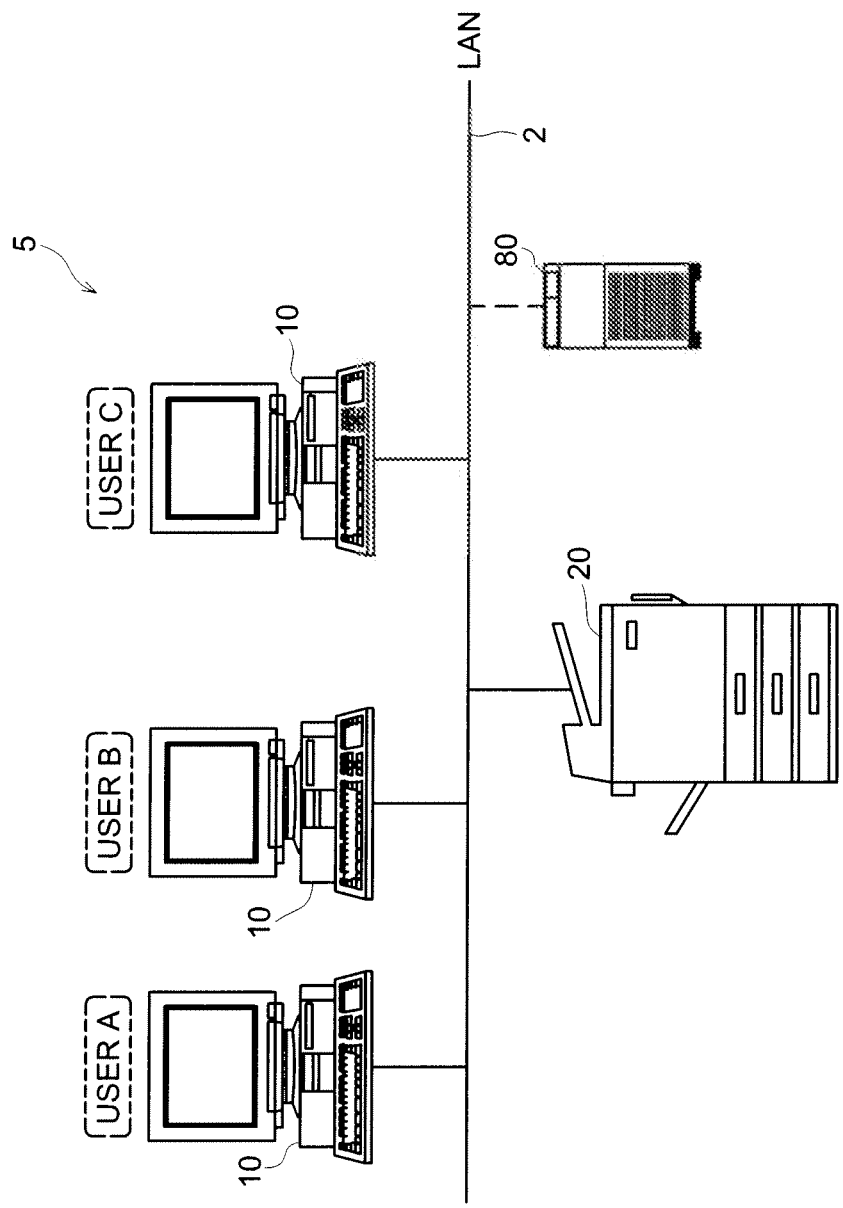
FIG. 1 shows a schematic diagram indicating an exemplified system configuration of a network printing system, in regard to a first embodiment of the present invention.

Referring to the drawings, preferred embodiments of the present invention will be detailed in the following.

First Embodiment

FIG. 1 shows a schematic diagram indicating an exemplified system configuration of a network printing system 5 constituted by a printing apparatus 20 embodied in the present invention as the FIRST EMBODIMENT, an arbitral number of terminal devices 10 that access the printing apparatus 20, etc., which are coupled to each other through a network 2, such as LAN (Local Area Network), etc.

The printing apparatus 20 is configured as a Multi Function Peripheral or a Multi Function Printer (hereinafter, also referred to as a MFP, for simplicity) that is provided with: a scanning function for optically reading a document to acquire image data, storing the acquired image data therein and/or transmitting it to the terminal device 10; a copy function for printing the copy image to be copied from the document onto a recording paper sheet based on the above-acquired image data, so as to output the recording paper sheet printed with the copy image therefrom; a facsimile function (hereinafter, also referred to as a FAX function) for transmitting and receiving an image (image data) to/from an external apparatus via facsimile through a public communication network, an E-mail function for transmitting an E-mail to the terminal device 10 through an E-mail server; etc.

Various kinds of jobs to be implemented by the printing apparatus 20 on the basis of the instructions inputted by the user include a copy job to be implemented by employing the abovementioned copy function, a print job to be implemented by employing a printer function, etc. When instructing the copy job, the user operates the printing apparatus 20 to input the instruction for implementing the copy job, while, when instructing the print job, the user operates the terminal device 10 to input the instruction for implementing the print job. In this connection, hereinafter, such the job that includes a kind of printing operation as above-mentioned is referred to as a "print job" as its general term.

Further, the printing apparatus 20 also serves as a print control apparatus that automatically conducts: an operation for determining availability of the interruption printing, namely, determining whether or not, in mid course of implementing a previously-instructed print job (first print job), an interruption printing of a later-instructed print job (second print job) should be allowed; controlling operations for implementing the interruption printing when determining that the concerned interruption printing should be allowed; etc.

The terminal device 10 is such an apparatus that accesses the printing apparatus 20 through the network 2, so as to conduct operations for instructing and/or requesting various kinds of operations, such as a document printing operation, etc. For instance, the terminal device 10 is constituted by installing a driver program (print driver) for driving the printing apparatus 20 into a personal computer or the like.

Figure 2:
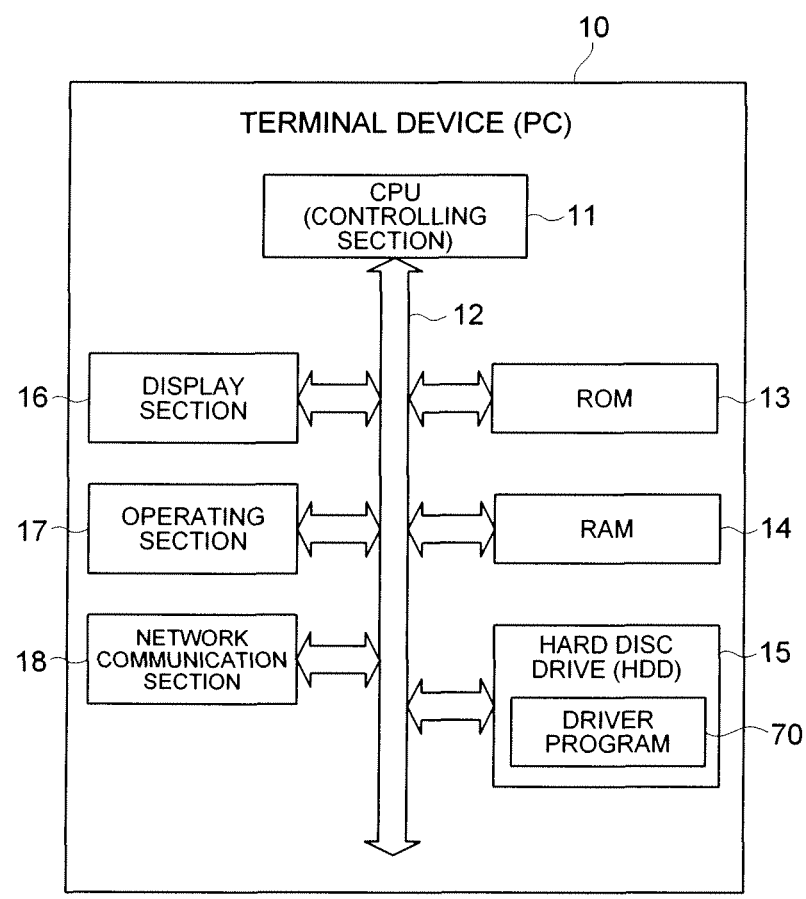
FIG. 2 shows a block diagram indicating a configuration of a controlling system in a terminal device, in regard to a first embodiment of the present invention.

FIG. 2 shows a block diagram indicating the configuration of the controlling system in the terminal device 10. The terminal device 10 is provided with an OS (Operating System) and various kinds of application programs to be executed on the OS concerned. Accordingly, the terminal device 10 is provided with: a user authenticating function (login function) for receiving a user's ID (Identification) and a password inputted by the user so as to authenticate the user concerned; a function for creating a document, etc., by executing the application program concerned; a function for accepting settings for a printing mode (printing conditions) by executing the driver program when conducting the document printing operation, to create a print job set with the concerned printing mode so as to transmit the created print job to the printing apparatus 20 through the network 2; etc.

The terminal device 10 is constituted by a CPU (Central Processing Unit) 11 serving as a controlling section, a ROM (Read Only Memory) 13, a RAM (Random Access Memory) 14, a hard disc drive 15 (hereinafter, also referred to as an HDD 15, for simplicity), a display section 16, an operating section 17 and a network communication section 18, which are coupled to each other through a bus 12.

The CPU 11 controls various kinds of operations to be conducted in the terminal device 10 by executing the programs stored in ROM 13. The RAM 14 serves as a working memory in which various kinds of data are temporarily stored when the CPU 11 executes a program, and is also utilized as other purposes. The hard disc drive 15 stores not only the OS and the application programs, but also a driver program 70 of the printing apparatus 20, a user's ID and a password serving as the authenticating information of a specific user, document data, various kinds of data to be stored, therein.

The display section 16 is constituted by a display device, such as LCD (Liquid Crystal Display), etc., so as to display a screen from which the operator can conduct operations and settings with respect to the OS, the application programs, the driver program 70 and the user authentication (login procedure), and various kinds of images and videos or the like, thereon. The operating section 17 is constituted by inputting devices, such as a keyboard, a mouse, etc., so as to accept operations and inputs to be conducted for the terminal device 10 by the user, therefrom. The network communication section 18 serves as an interface for communicating with the printing apparatus 20 through the network 2.

When instructing the printing apparatus 20 to perform a printing operation from the terminal device 10, the user logins the terminal device 10, so as to conduct print instructing operations in respect to a desired document through the display section 16 and the operating section 17. The abovementioned instructing operations may include an operation for setting a printing mode, as needed.

When the print instructing operations including the operation for setting the printing mode is completed by the user concerned, a print job including print data, such as document data serving as a print object, is created by executing the driver program 70 in the terminal device 10. In addition, information in regard to the terminal device 10 (terminal device information), a user's ID, various kinds of attribute information in regard to the above-mentioned document data, etc., printing mode information representing the printing mode established in the above, etc. are attached to the header of the above-created print job. The CPU 11 of the terminal device 10 transmits the print job to the printing apparatus 20 to instruct the printing operation by executing the driver program 70.

The terminal device information to be attached to the print job includes, for instance, an ID (Identification) of the terminal device 10, an IP address information on the network 2, etc. The attribute information includes file name information representing a name of document (file name) under the printing instruction, page number information representing a number of pages, data size information representing the size of the print data, etc.

The printing mode information is such information that indicates various kinds of printing modes, such as a size (A4/A3, etc.) of recording paper sheet to be used for the printing, a printing direction (vertical direction/horizontal direction), a one side printing/a duplex printing, an intensive printing (Nin1 (1in1/2in1/4in1, etc.)) in which plural pages are intensively printed into a single page, a monochrome/a color, a resolution, a designation of printing page, a number of copies, etc.

Figure 3:
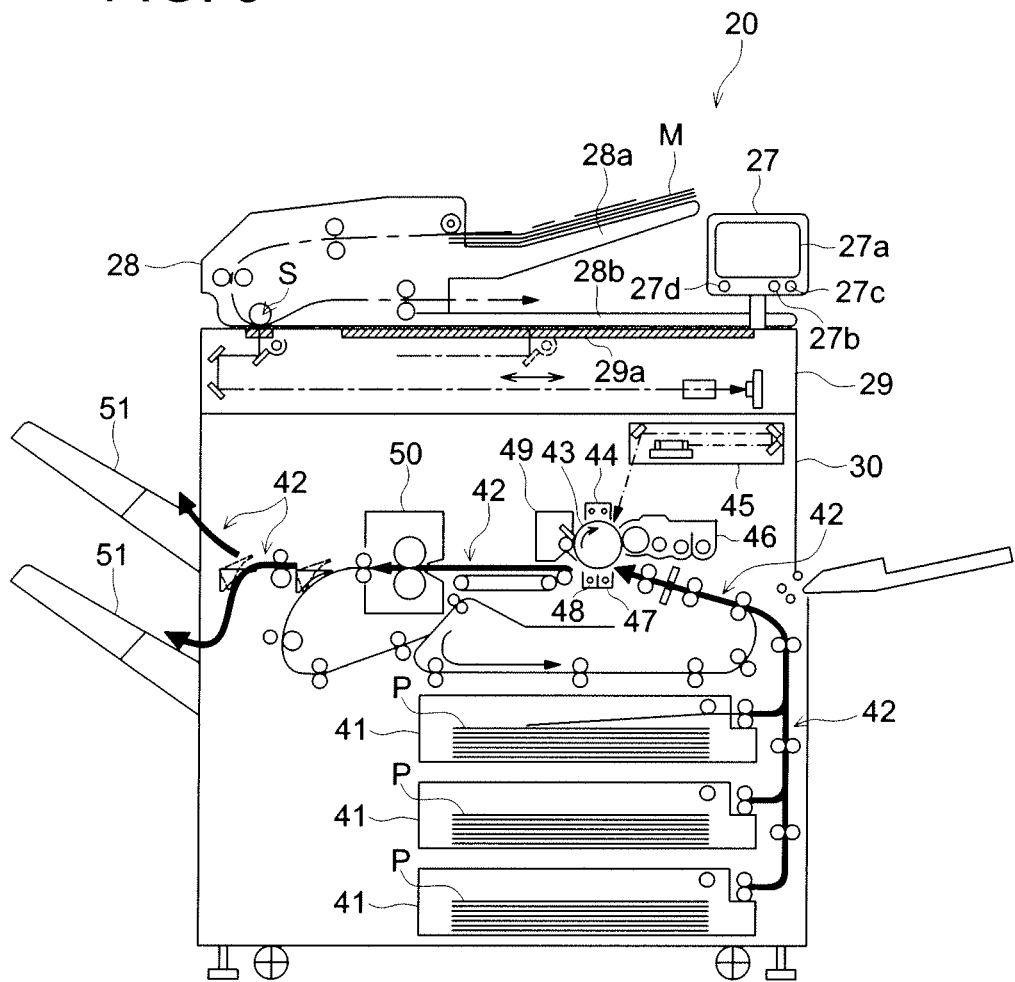
FIG. 3 shows a schematic diagram indicating a mechanical configuration of a printing apparatus, in regard to a first embodiment of the present invention.

FIG. 3 shows a schematic diagram indicating a mechanical configuration of the printing apparatus 20. The printing apparatus 20 is provided with: an operation display section 27; an automatic document feeder 28 that pickups and conveys document paper sheets, included in a document M placed on a document feeding tray 28a, one by one, so as to make each document paper sheet pass through a reading position S and eject on a document ejecting tray 28b; a scanner section 29 that optically reads the each document paper sheet at the reading position S while it is automatically conveyed through the reading position S so as to acquire image data of the document M, or that optically reads the document M placed on a platen glass 29a so as to acquire image data of the document M; and a printer section 30 that prints an image represented by the inputted image data (image in regard to the print job concerned) onto a recording paper sheet P and ejects the printed recording paper sheet P.

The automatic document feeder 28 is provided with such a function that measures a thickness and a weight of the document M (bunch of document paper sheets) so as to calculate a number of document paper sheets included in the document M placed on the document feeding tray 28a. For instance, the scanner section 29 is provided with: a light source to irradiate light onto the document M; a line image sensor to read one scanning line segment of the document paper sheet in its width direction; a moving mechanism to move the reading position of the document paper sheet in a unit of one scanning line segment; an optical path that constituted by lenses and mirrors so as to guide and focus the light, reflected from the document paper sheet, onto the line image sensor; etc. The analogue image signals outputted by the line image sensor is converted to digital image data by applying the analogue-to-digital conversion processing, and the digital image data is outputted.

The printer section 30 is provided with: a paper sheet feeding unit (paper feeding apparatus) 41; a conveyance device 42; a photoreceptor drum 43; a charging device 44; a laser unit 45; a developing device 46; a transferring device 47; a separating device 48; a cleaning device 49; a fixing device 50; an ejecting tray 51; etc., so as to configure it as a laser printer in which the recording paper sheet P is fed from the paper sheet feeding unit 41 and conveyed by the conveyance device 42, and then, the image represented by the inputted image data is formed on the recording paper sheet P through an electro-photographic process implemented by the operational actions performed by the photoreceptor drum 43 through the fixing device 50, and finally, the printed recording paper sheet P is ejected onto the ejecting tray 51. In this connection, any other printer that employs a printing method other than the electro-photographic process, such as a LED (Light Emitting Diode) printer in which light emitted by the LED are irradiated onto the photoreceptor drum, instead of the laser beam, may be also applicable in the present invention.

Figure 4:
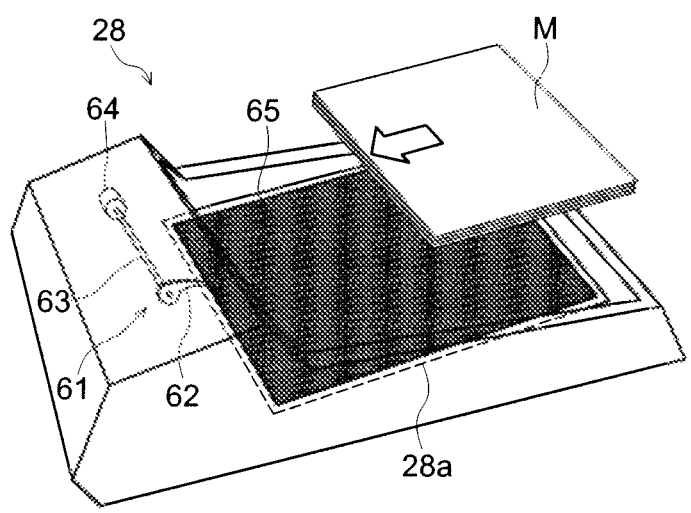
FIG. 4 shows a perspective view indicating a configuration of an automatic document feeder for measuring a thickness and a weight of a document, in regard to a first embodiment of the present invention.
Figure 5:
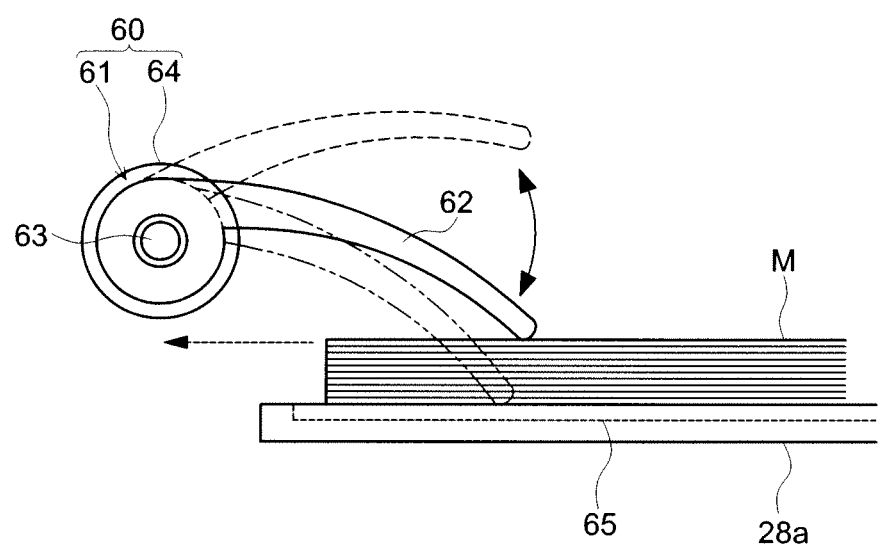
FIG. 5 shows a front view indicating a configuration of an automatic document feeder for measuring a thickness and a weight of a document, in regard to a first embodiment of the present invention.

FIG. 4 and FIG. 5 show schematic diagrams indicating configurations for measuring the thickness and the weight of the document M in the automatic document feeder 28.

The automatic document feeder 28 is provided with; a document thickness measuring mechanism 60 to measure the thickness of the document M placed on the document feeding tray 28a; a document weight sensor 65 to measure the weight of the document M; and a plurality of document sensors (not shown in the drawings) to detect a presence or absence of the document M on the document feeding tray 28a, and to detect a size of the document M placed on the document feeding tray 28a.

The document thickness measuring mechanism 60 is constituted by an actuator 61 disposed at an upper space of the leading side of the document feeding tray 28a, and a document thickness sensor 64 that measures the thickness of the document M placed on the document feeding tray 28a through the actuator 61. Further, the actuator 61 is provided with: a contacting arm 62, which is shaped in an arm and turns in both upper and lower directions, so as to separate and contact from/to an upper surface of the leading edge portion of the document M placed on the document feeding tray 28a; a rotating shaft 63, which is coupled to the base section of the contacting arm 62 so as to support the contacting arm 62 in a rotatable manner; a driving source (not shown in the drawings), such as a motor, etc., to rotate the rotating shaft 63 in both normal and reverse directions. The document thickness sensor 64 serves as a sensor to detect a rotating angle (rotation angle) of the rotating shaft 63, and for instance, constituted by a rotation angle sensor (potentiometer, etc.), etc., that changes output voltage according to the magnitude of the rotation angle.

As indicated by the alternate long and short dashes lines shown in FIG. 5, the document thickness measuring mechanism 60 establishes the voltage, which is outputted by the document thickness sensor 64, corresponding to the angle of the rotating shaft 63, in the reset state in which the leading edge of the contacting arm 62 is made to contact the surface of the document feeding tray 28a, as a reset voltage. In the normal state, the actuator 61 raises the contacting arm 62 so as to separate it from the document feeding tray 28a as indicated by the broken lines shown in FIG. 5. At the document detected time when the document M, placed on the document feeding tray 28a, is detected by the document sensors, the actuator 61 drives the contacting arm 62 to rotate it downward, so as to make the leading edge of the contacting arm 62 contact the upper surface of the leading edge portion of the document M, as indicated by the solid lines shown in FIG. 5. In this contacting state, the differential value, between the voltage outputted by the document thickness sensor 64, corresponding to the angle of the rotating shaft 63, and the reset voltage, is defined as a measured voltage, and the thickness of the document M (bunch of document paper sheets) is calculated from the above-defined measured voltage. When the measurement of the thickness of the document M is completed, the actuator 61 is driven to rotate in the reverse direction so as to evacuate the contacting arm 62 into the upper position indicated by the broken lines shown in FIG. 5.

The scope of the document thickness measuring mechanism is not limited to the abovementioned configuration for measuring the thickness of the leading edge portion of the document M, but it is also applicable that the contacting arm contacts the side edge portion of the upper surface of the document so as to measure the thickness of the side edge portion concerned.

As shown in FIG. 4 and FIG. 5, the document weight sensor 65 is embedded into the area on which the document M is placed within the upper surface of the document feeding tray 28a. The document weight sensor 65 is constituted by a loading sensor, such as a distortion gage method employing a distortion gage (strain gage) in which an electric resistance value is made to vary (output voltage is made to vary) in response to an amount of distortion generated by an external force, a piezoelectric element method employing a piezoelectric element in which output voltage is made to vary in response to an amount of inputted load, etc.

The document weight sensor 65 establishes the voltage, which is outputted in such a no-load state that the document M is not placed on the document feeding tray 28a and no load is applied thereon, as a reset voltage. The differential value, between the voltage outputted in response to an amount of load when the document M is placed on the document feeding tray 28a and its weighted load is applied thereon and the reset voltage, is defined as a measured voltage, and the weight of the document M (bunch of document paper sheets) is calculated from the above-defined measured voltage.

The scope of the document weight sensor abovementioned is not limited to one constituted by a single sensor, but it is also applicable that the document weight sensor is constituted by a plurality of sensors separately disposed at appropriate positions.

Figure 6:
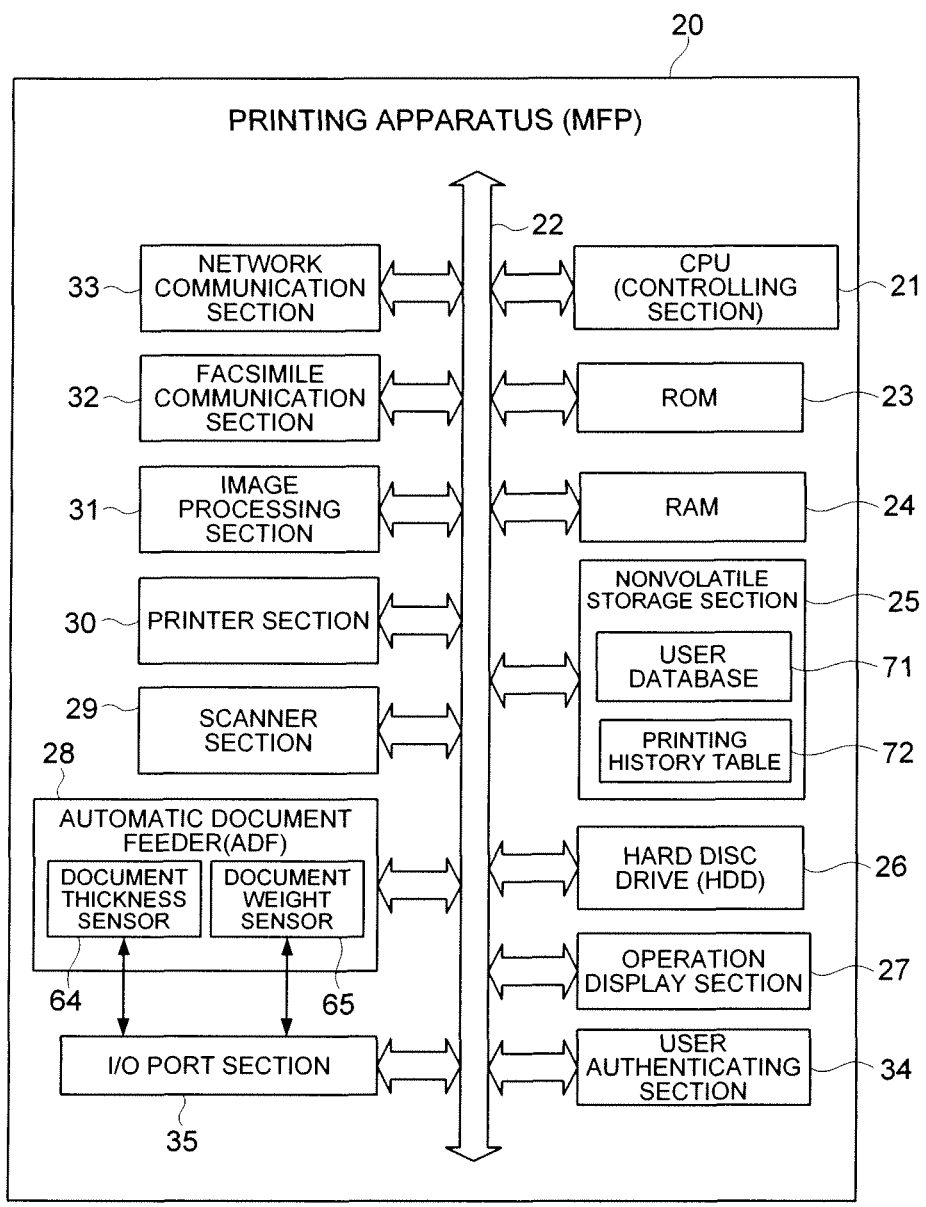
FIG. 6 shows a block diagram indicating a configuration of a control system of a printing apparatus 20, in regard to a first embodiment of the present invention.

FIG. 6 shows a block diagram indicating a configuration of the control system of the printing apparatus 20. As shown in FIG. 6, the printing apparatus 20 is constituted by a CPU (Central Processing Unit) 21 serving as a controlling section, a ROM (Read Only Memory) 23, a RAM (Random Access Memory) 24, a nonvolatile storage section 25, a hard disc drive 26, the operation display section 27, the automatic document feeder 28, the scanner section 29, the printer section 30, an image processing section 31, a facsimile communication section 32, a network communication section 33, a user authenticating section 34 and an I/O (Input/Output) port section 35, which are coupled to each other through a bus 22.

The CPU 21 executes various kinds of programs stored in the ROM 23 so as to control various kinds of operations to be conducted in the printing apparatus 20. The RAM 24 serves as a working memory into which various kinds of data are temporarily stored when the CPU 21 executes the programs. Further, other than the working memory, the RAM 24 also serves as an image memory into which various kinds of image data are temporarily stored, or the like.

The nonvolatile storage section 25 is such a storage that can retain the stored contents even if the electric power source is turned OFF, and accordingly, stores information inherent to the apparatus concerned, various kinds of setting information, user database 71, a printing history table 72, etc., therein.

The user database 71 stores information of the user who is permitted to use the printing apparatus 20, therein. For instance, for every user, a user's ID, authenticating information, setting information, an IP address of the terminal device 10 currently used by the user concerned, an E-mail address, etc., are stored in the user database 71, while correlating them with each other.

The printing history table 72 is such a table that is employed for storing and controlling information in regard to the history of the copy job implemented by the printing apparatus 20 on the basis of the instructions inputted by the user, and/or the print job received from the terminal device 10 and implemented, for every user.

With respect to the print job, terminal device information attached to the print job concerned, a user's ID, attribute information of document, etc., a printing mode, a job ID issued by the CPU 21 when transmitting the print job concerned, a reception date and time, a status (such as "wait implementation"/"implementation completed"/"finalization due to error" etc.), an implementation date and time, etc., are stored in the printing history table 72, while correlating them with each other.

With respect to the copy job, a user's ID of the user who instructed the copy job concerned (authenticated user), a job ID issued by the CPU 21 when accepting the instruction for implementing the copy job concerned, a acceptance date and time, a status (such as "wait implementation"/"implementation completed"/"finalization due to error" etc.), an implementation date and time, a printing mode established by the user, etc., are stored in the printing history table 72, while correlating them with each other. For instance, the printing mode of the copy job includes a size of recording paper sheet to be employed for printing (such as A4, A3, etc.), any one of "one side reading-one side printing"/"one side reading-duplex printing"/"both side reading-one side printing"/"both side reading-duplex printing", an intensive printing (Nin1), a monochrome/color printing, a number of copies, etc.

The hard disc drive 26 stores not only various kinds of data to be stored, but also image data acquired by reading the document in the scanning and copying operations, print data (image data) included in the print job instructed from the terminal device 10, etc., therein.

The operation display section 27 serves as a display section to display various kinds of screens, such as an operational screen, a setting screen, a screen for selection, an inputting screen, a guidance screen, etc., and also serves as an operating section to accept various kinds of manual operations to be conducted by the user, such as an operation in regard to the function of the printing apparatus 20, a setting operation, an operation for inputting information, etc. In the present embodiment, as shown in FIG. 3, the operation display section 27 is constituted by a LCD (Liquid Crystal Display) 27*a* serving as the display section, a touch panel formed on the surface of the LCD 27*a* so as to detect a coordinate position depressed by the user, a start button 27*b*, a stop button 27*c*, a cancel button 27*d*, a ten-key (numeric keyboard, not shown in the drawings), various kinds of operating switches (not shown in the drawings), etc.

The image processing section 31 applies a rasterize processing to the print data (print data in the vector format) received from the terminal device 10, and also applies various kinds of image processing, such as an image correction processing, a rotation processing, a size enlargement/reduction processing, a compression/expansion processing, etc., to the image data.

The facsimile communication section 32 serves as an interface to communicate with an external device provided with a facsimile function through a public communication-line network. While, the network communication section 33 serves as another interface to communicate with the terminal device 10 and/or a server through the network 2.

The user authenticating section 34 serves as an acquiring section to acquire authentication use data (authentication information) to be used for authenticating the user. It is possible to employ any one of general purpose authentication technologies, for instance, including: a card authentication technology in which the authentication use data stored in the ID (Identification) card possessed by the user is read by employing a contacting or non-contacting card reader, so as to collate the read data with the authentication information registered in advance, to authenticate the individual user; a biometric authentication technology in which biological information, such as finger prints of the user, a finger vein pattern of the user, etc., is read as the authentication use data by employing the biometric authentication unit or the like, so as to collate the read data with the authentication information registered in advance, to authenticate the individual user; and a password authentication technology in which a password serving as the authentication use data is inputted from the operation display section 27 by the user, so as to collate the inputted data with the authentication information registered in advance, to authenticate the individual user; etc., or any combination of them as the method for authenticating the user.

The I/O port section 35 serves as an input/output section through which the CPU 21 transmits and receives various kinds of data to/from the external device or the like. The document thickness sensor 64 and the document weight sensor 65, both of which are provided with the automatic document feeder 28, are coupled to the I/O port section 35.

Next, operations to be conducted in the printing apparatus 20 will be detailed in the following. Initially, a method (algorism) for determining whether or not the first print job should be temporarily suspended in mid course of its implementation in order to allow the interruption printing of the second print job will be detailed in the following. Successively, an operating procedure for determining the availability of the interruption printing and operations for controlling the interruption printing will be detailed in the following.

<Method for Determining Availability of Interruption>

The operation for determining the availability of the interruption printing is performed by employing four parameters indicated as follows, in order to optimize the beneficial balance between the first print job serving as the interrupted side and the second print job serving as the interrupting side. In this connection, hereinafter, the "first print job" that is previously inputted (instructed) and currently in mid course of its implementation is also referred to as a "preceding print job", while, the "second print job" that is lately inputted (instructed) is also referred to as an "inputted print job", Further, hereinafter, the following definitions are established.

A residual printing time of the first print job (preceding print job) is defined as "T1".

A printing time of the second print job (inputted print job) is defined as "T2".

A priority degree of the first print job (preceding print job) is defined as "P1".

A priority degree of the second print job (inputted print job) is defined as "P2".

The residual printing time of the first print job "T1" is such a time (predicted value) that is calculated by dividing "N1", which is defined as a number of residual paper sheets to be printed (number of residual sheets) at the time when the second print job is inputted, by "V1", which is defined as a printing velocity (sheets/minute). Namely, the residual printing time "T1", the number of residual papers "N1" and the printing velocity "V1" fulfill the Equation indicated as follow.

$$T1=N1/V1$$

The original number of paper sheets to be printed in the first print job is specified by the number of document paper sheets (number of paper sheets to be read) and the printing mode in the case of the copy job, while that is specified by the number of pages included in the document concerned and the printing mode in the case of the print job. With respect to the printing velocity (number of printed paper sheets per one minute (sheets/minute)), a reference printing velocity value based on the printing mode, such as A4 size, one side, monochrome, etc., is established in advance corresponding to the specifications and efficiency of the apparatus-type concerned. Accordingly, when the printing mode set in the current print job is different from the reference settings, sometimes, the printing velocity would be possibly changed from the reference printing velocity value. This printing mode that influences the number of printing paper sheets and the printing velocity includes: the size of recording paper sheet; one side printing/duplex printing; the intensive printing; the monochrome/color printing; the number of copies (including the printing page designation in the case of the print job); etc., which are aforementioned.

The printing time of the second print job "T2" is such a time (predicted value) that is calculated by dividing "N2", which is defined as a number of paper sheets to be printed in the second print job concerned, by "V2", which is defined as a printing velocity (sheets/minute). Namely, the printing time "T2", the number of residual papers "N2" and the printing velocity "V2" fulfill the Equation indicated as follow.

$$T2=N2/V2$$

As well as in the case of the first job, in this case, the number of paper sheets to be printed in the first print job is specified by the number of document paper sheets or the number of pages included in the document concerned and the printing mode, and further, sometimes, the printing velocity would be possibly changed from the reference printing velocity value corresponding to the printing mode. In this connection, however, the number of document paper sheets is defined as an estimated number of paper sheets (estimated value) that is calculated from the measured results (measured voltages outputted by the document thickness sensor 64 and the document weight sensor 65) acquired by measuring the thickness and weight of the bunch of document placed on the automatic document feeder 28, instead of the number of paper sheets to be read (count value) acquired by actually counting the document paper sheets to be read. The number of document paper sheets can be calculated by measuring at least one of the thickness and the weight. Further, it is also applicable that the size of the document, detected by the document sensor, is taken into account in the abovementioned calculation.

The priority degree of the print job is specified as, for instance, any one of three stages of a low priority "Low" <a medium priority "Mid"<a high priority "High", etc., and is established in a unit of user or in a unit of job.

When the priority degree is established in a unit of user, the priority degrees are established in advance for every user, and then, registered into the user database 71, so as to use the priority degree that corresponds to a specific user identified as the user who inputted the print job concerned, as a parameter for determining the availability of the interruption printing. The operation for identifying the specific user is implemented by performing the user authenticating operation in the case of the copy job, while, in the case of the print job, implemented on the basis of the user's ID attached to the print job concerned.

When the priority degree is established in a unit of job, the priority degree is established as a temporal priority degree that is effective only for the print job established by the user at the time when inputting the concerned print job, and this priority degree is used as a parameter for determining the availability of the interruption printing. The operation for establishing the priority degree is conducted by employing a copy job setting screen (printing mode setting screen) displayed on the operation display section 27 of the printing apparatus 20 in the case of the copy job, while, in the case of the print job, conducted by employing a print job setting screen (printing mode setting screen) displayed on the display section 16 of the terminal device 10. Further, in the case of the print job, priority degree information representing the above-established priority degree is attached to the print job concerned, so as to transmit the priority degree information to the printing apparatus 20. In the printing apparatus 20, the CPU 21 stores the priority degree established in a unit of job into the printing history table 72 as the history information of the job concerned, in both of the cases of copy job and print job.

Then, based on the four parameters abovementioned, the CPU 21 conducts the operation for determining the availability of the interruption printing. Concretely speaking, the CPU 21 finds an allowable time interval (interruption allowable time) during which the interruption printing is to be allowed, corresponding to the residual printing time "T1" of the first print job, and determines that the interruption printing is allowable, if the printing time of the second print job is equal to or shorter than the interruption allowable time, while determines that the interruption printing is unallowable, if the printing time of the second print job exceeds the interruption allowable time.

The interruption allowable time is established in such a manner that the longer the residual printing time of the first print job is, the longer the interruption allowable time becomes (in other words, the longer the residual printing time of the first print job is, the more advantageous the implementation of the second print job becomes). Further, the present embodiment is so constituted that, based on the priority degrees of the first print job and the second print job (based on the priority ratio of the first print job and the second print job), the length of the interruption allowable time is changed. In the present embodiment, the higher the priority degree of the first print job is, compared to that of the second print job, the shorter the interruption allowable time becomes (advantageous for the first print job), while, the higher the priority degree of the second print job is, compared to that of the first print job, the longer the interruption allowable time becomes (advantageous for the second print job).

Further, the present embodiment is so constituted that, when the residual printing time of the first print job is reduced to a value equal to or shorter than a predetermined time interval, the interruption printing is banned from being actually implemented, due to such a reason that, when the residual printing time of the first print job is relatively short, it is desirable to complete the first print job concerned, instead of implementing the interruption printing. The predetermined time interval is established as the interruption prohibited time interval.

The CPU 21 calculates the interruption allowable time "T" by employing the Equation (1) reflecting the abovementioned facts and indicated as follows, so as to determine that the interruption printing is allowable, if the printing time of the second print job "T2" is equal to or shorter than the interruption allowable time calculated in the above, while determine that the interruption printing is unallowable, if the printing time of the second print job "T2" exceeds the interruption allowable time.

$$T = (T1 - TN) \times (p2/p1) \tag{1}$$

When $T \geq T2 \Rightarrow$ interruption printing is allowable.
When $T < T2 \Rightarrow$ interruption printing is unallowable.
"T" is defined as the interruption allowable time.
"TN" is defined as the interruption prohibited time.
"p1" is defined as a variable to be established corresponding to the level of the priority degree of the first print job "P1".
"p2" is defined as a variable to be established corresponding to the level of the priority degree of the second print job "P2".
("T1" and "T2" have been indicated in the foregoing)

Each of numerals "p1" and "p2" indicated in the Equation (1) is such a variable that its magnitude corresponds to the level of the priority degree, being any one of three stages of the low priority "Low"<the medium priority "Mid"<the high priority "High". It is applicable that the same numerical value is allotted to both the variables of the first and second print jobs, being the same as each other: or the numerical values, being different from each other, are respectively allotted to both the variables of the first and second print jobs, being the same as each other. For instance, it is applicable that the numerical value having a magnitude being larger than that of the second print job is allotted to the first print job, as indicated as follows.

Priority degree: Low$\Rightarrow$ p1 Low>P2 Low
Priority degree: Mid$\Rightarrow$ p1 Mid>P2 Mid
Priority degree: High$\Rightarrow$ p1 High>P2 High The item (p2/p1) included in the Equation (1) represents the priority ratio between the first print job and the second print job.

It is applicable that the setting value of the interruption prohibited time is either changeable or eliminated (interruption prohibited time is set at zero). Further, it is also applicable that the interruption prohibited time is variable corresponding to the level of the priority degree, instead of a fixed time interval. For instance, it is applicable that, according as the level of the priority degree of the first print job becomes higher than ever, the interruption prohibited time is made to be longer than ever, or alternatively, according as the level of the priority degree of the second print job becomes higher than ever, the interruption prohibited time is made to be shorter than ever.

In this connection, when the "T1" is shorter than "TN" (T1<TN), the value of "T" becomes a minus value. In this case, interruption printing becomes unallowable.

The interruption availability determining method, embodied in the present invention, in which the availability of the interruption printing is determined by comparing the interruption allowable time derived by employing the Equation (1) and the printing time of the print job of the interrupting side with each other, is such an advantageous determining method that is based on the complex factors including not only quantitative parameters, such as the time intervals required for implementing both of the printing operations in the print job to be performed in the interrupted side (first print job) and that to be performed in the interrupting side (second print job), but also qualitative parameters, such as the priority degrees of the both parties.

Figure 7:
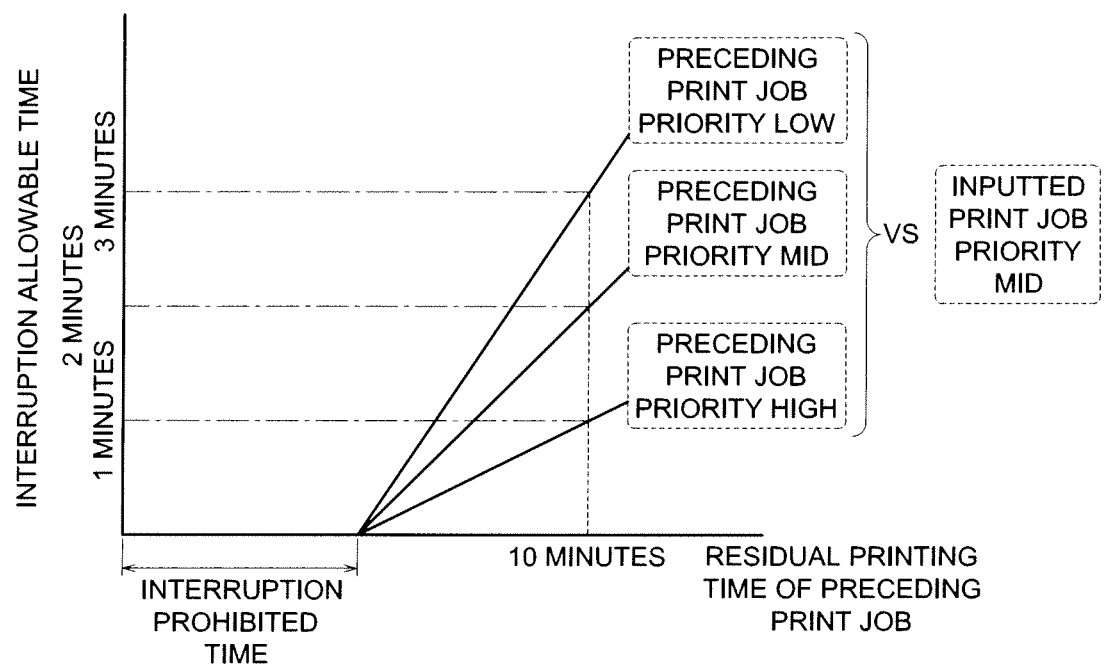
FIG. 7 shows a graph indicating an exemplified relationship between a residual printing time of a first print job and the interruption allowable time, when a priority degree of a second job is a medium level, in regard to a first embodiment of the present invention.
Figure 8:
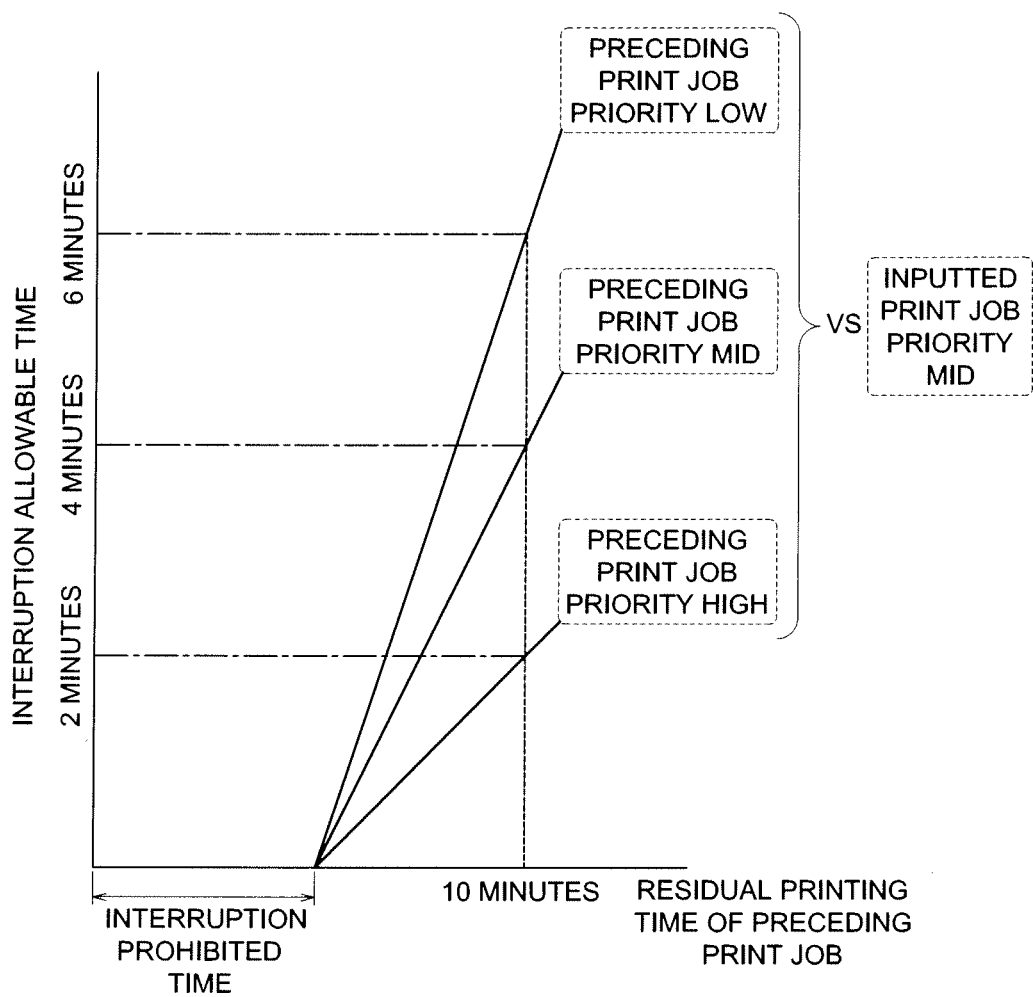
FIG. 8 shows a graph indicating an exemplified relationship between a residual printing time of a first print job and the interruption allowable time, when a priority degree of a second job is a high level, in regard to a first embodiment of the present invention.
Figure 9:
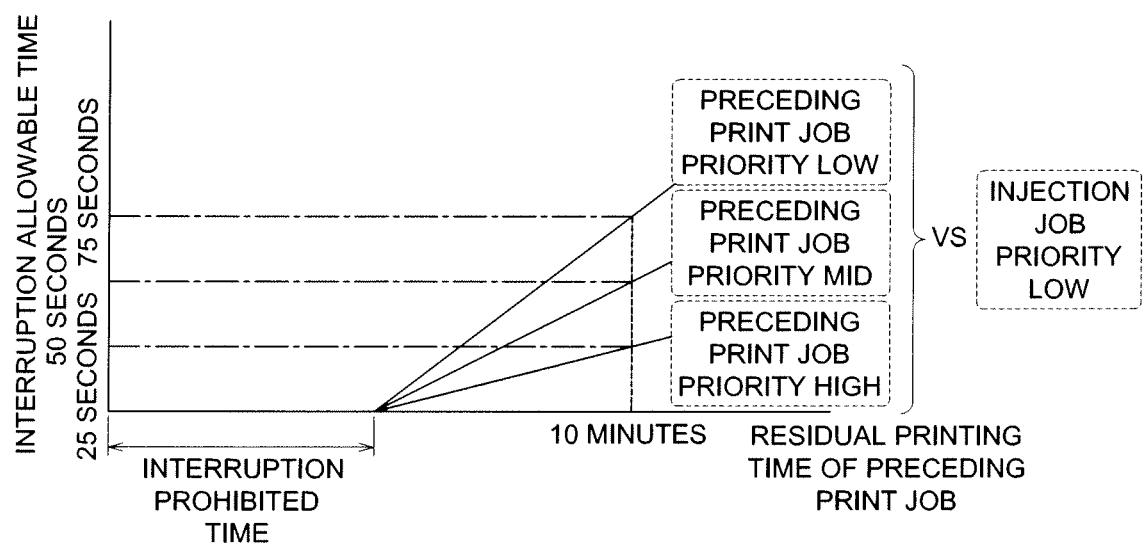
FIG. 9 shows a graph indicating an exemplified relationship between a residual printing time of a first print job and the interruption allowable time, when a priority degree of a second job is a low level, in regard to a first embodiment of the present invention.

FIG. 7 through FIG. 9 show graphs indicating exemplified relationships between the residual printing time of the first print job and the interruption allowable time, derived by employing the Equation (1). FIG. 7 shows a graph indicating the relationship when the priority degree of the second print job (inputted print job) is set at medium priority "Mid", FIG. 8 shows a graph indicating the other relationship when the priority degree of the second print job is set at high priority "High", FIG. 9 shows a graph indicating still the other relationship when the priority degree of the second print job is set at low priority "Low".

In each of the graphs, the horizontal axis represents the residual printing time of the first print job (preceding print job), while the vertical axis represents the interruption allowable time. The three graphic lines respectively correspond to the three stage priority degrees of the first print job. Further, the higher the priority degree is, the lager the growth increment (inclination) of the interruption allowable time versus the increase of the residual printing time becomes. Still further, the time interval from the zero point of the horizontal axis to the predetermined time is established as the interruption prohibited time, so that every one of the three graphic lines is depicted as such an inclined straight line that is originated from the final point of the interruption prohibited time and makes the interruption allowable time increase according as the residual printing time increases.

As shown in FIG. 7, when the priority degree of the second print job is set at medium priority "Mid", and for instance, the residual printing time of the first print job is "10 minutes", the interruption allowable time can be read as "2 minutes" from the graph. Further, in the same way, when the second print job is set at high priority "High", the interruption allowable time can be read as "3 minutes", and when the second print job is set at low priority "Low", the interruption allowable time can be read as "1 minutes".

In the same way as indicated in the above, when the residual printing time of the first print job is "10 minutes", the interruption allowable times can be found from the graphs shown in FIG. 8 and FIG. 9.

When the priority degree of the second print job is set at high priority "High" (shown in FIG. 8):
Priority degree of the first print job; "High"
$\Rightarrow$ Interruption allowable time; 6 minutes:
Priority degree of the first print job; "Mid"
$\Rightarrow$ Interruption allowable time; 4 minutes:
Priority degree of the first print job; "Low"
$\Rightarrow$ Interruption allowable time; 2 minutes.

When the priority degree of the second print job is set at high priority "Low" (shown in FIG. 9):

Priority degree of the first print job; "High"
⇒ Interruption allowable time; 75 seconds:
Priority degree of the first print job; "Mid"
⇒ Interruption allowable time; 50 seconds:
Priority degree of the first print job; "Low"
⇒ Interruption allowable time: 25 seconds.

If the printing time of the second print job is equal to or shorter than the interruption allowable time indicated in the above, the interruption printing of the second print job is determined as allowable, while, if the printing time of the second print job exceeds the above interruption allowable time, the interruption printing of the second print job is determined as unallowable. Further, when the residual printing time of the first print job is equal to or shorter than the interruption prohibited time, the interruption printing of the second print job is determined as unallowable.

<Operation for Determining Availability of Interruption Printing and Controlling Operations>

Figure 10:
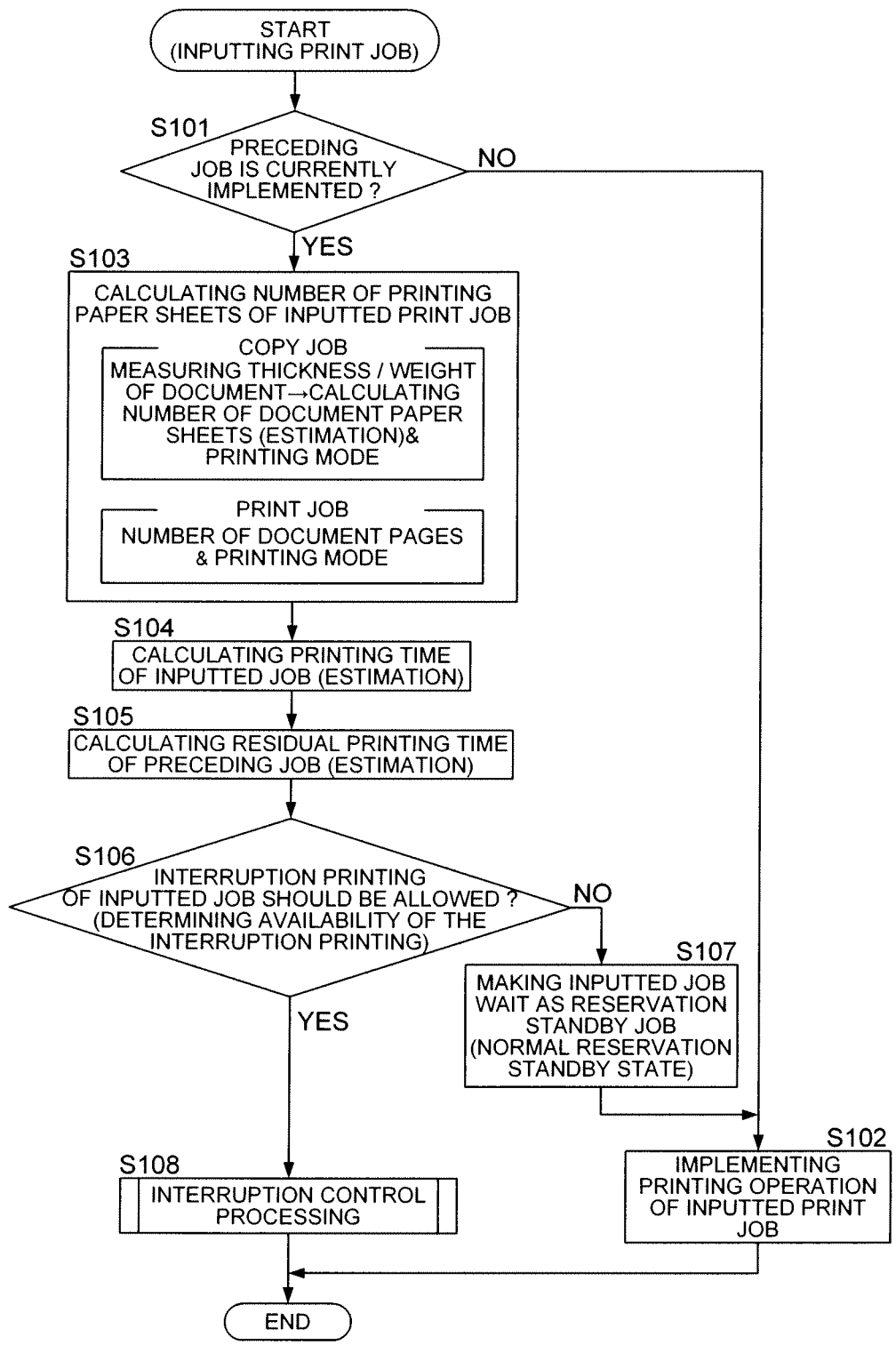
FIG. 10 shows a flowchart indicating a main routine for determining an availability of an interruption printing and controlling the interruption printing, in regard to a first embodiment of the present invention.
Figure 11:
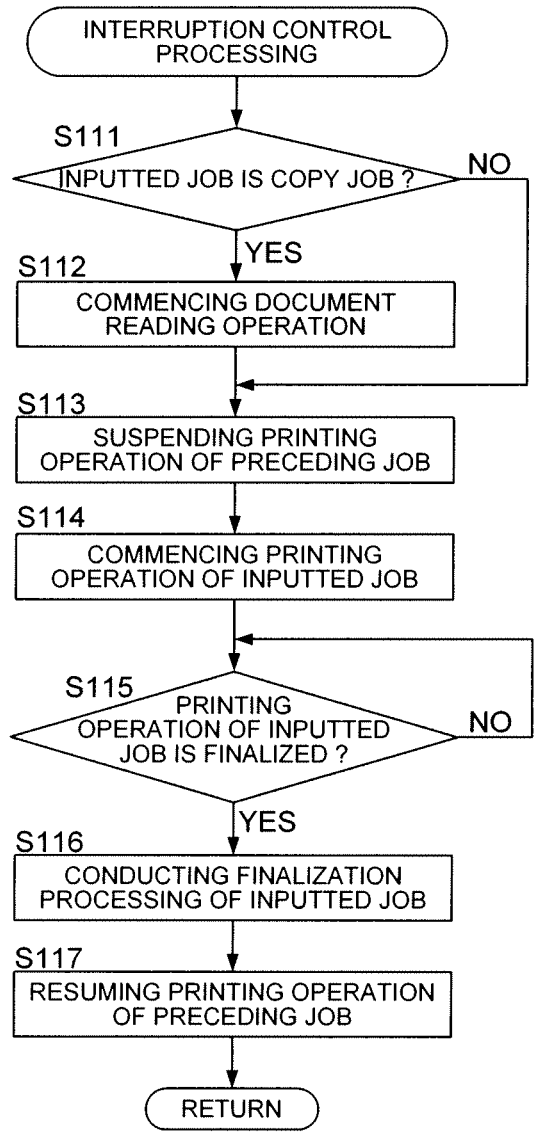
FIG. 11 shows a flowchart indicating a sub routine of a main routine, shown in FIG. 10, for controlling a interruption printing in regard to a first embodiment of the present invention.

FIG. 10 and FIG. 11 show flowcharts indicating operational flows for determining the availability of the interruption printing and controlling the interruption printing, which are to be conducted in the printing apparatus 20.

When implementing an operation for copying the document in the printing apparatus 20, the user places the document onto the automatic document feeder 28, and inputs the settings of the printing mode, and then depresses the start button 27b of the operation display section 27. When establishing the priority degree in a unit of job with respect to the copy job concerned, the user initially performs the operations for selecting and setting the desired priority degree (any one of "Low"<"Mid"<"High"), and then, depresses the start button 27b. When implementing an operation for printing the document in the printing apparatus 20, the user operates the terminal device 10 so as to designate the desired document and to establish the printing mode, and, after that, inputs the print implementation instruction (such as, an operation for clicking the OK button, etc.). When establishing the priority degree in a unit of job with respect to the print job concerned, the user initially performs the operations for selecting and setting the desired priority degree (any one of "Low"<"Mid"<"High"), and then, depresses the start button 27b.

When any one of the jobs (copy job/print job) is inputted into the printing apparatus 20 (START) and no preceding job is currently implemented by the printer section 30 (Step S101; No), the CPU 21 of the printing apparatus 20 implements the printing operation of the inputted print job concerned (Step S102), and then, finalizes this operational flow when completing the print job concerned (END). On the other hand, when a preceding job is currently in mid course of being implemented (Step S101; Yes), the CPU 21 calculates the number of printing paper sheets of the inputted print job concerned (Step S103).

In the case of the copy job, a number of document paper sheets is calculated (estimated) by measuring the thickness and/or the weight of the document (bunch of the document paper sheets) placed onto the automatic document feeder 28, so as to calculate the number of printing paper sheets based on the above-estimated number of document paper sheets and the printing mode established in respect to the copy job concerned. In the case of the print job, the number of printing paper sheets is calculated on the basis of the number of pages included in the document etc., and the printing mode, which are attached to the print job concerned.

Successively, the CPU 21 divides the above-calculated number of printing paper sheets by the printing velocity derived from the printing mode of the inputted job, so as to calculates (estimates) the printing time of the inputted job concerned (Step S104). Further, the CPU 21 divides the number of residual printing paper sheets of the preceding job at the time when the inputted job is inputted, by the printing velocity derived from the printing mode of the preceding job, so as to calculates (estimates) the residual printing time of the preceding job (Step S105), and then, determines whether or not the interruption printing of the inputted job should be allowed by temporarily suspending the preceding job (Step S106). The detailed operations for determining the availability of the interruption printing are performed in the same manner as those describe in the foregoing. Namely, the interruption allowable time "T" is calculated by employing the Equation (1) including the residual printing time of the preceding job "T1", the interruption prohibited time "TN", the variable "p1" corresponding to the priority degree of the preceding job "P1", the variable "p2" corresponding to the priority degree of the inputted job "P2". Then, the CPU 21 determines that the interruption printing is allowable, if the printing time of the inputted job "T2" is equal to or shorter than the interruption allowable time calculated in the above, while determines that the interruption printing is unallowable, if the printing time of the second print job "T2" exceeds the interruption allowable time.

When determining that the interruption printing is unallowable (Step S106; No), the CPU 21 makes the inputted job wait as a reservation standby job (Step S107), so as to implement the inputted job after the implementation of the preceding job has been completed, and then, finalizes this operational flow when completing the inputted job concerned (END). On the other hand, when determining that the interruption printing is allowable (Step S106; Yes), the CPU 21 conducts the operations for controlling the interruption printing indicated by the subroutine shown in FIG. 11 (Step S108), and then, finalizes this operational flow (END).

In the subroutine shown in FIG. 11, when the inputted job is the copy job (Step S111; Yes), the CPU 21 stats to read the document placed on the automatic document feeder 28 (Step S112), and then, shifts to Step S113. On the other hand, when the inputted job is the print job (Step S111; No), the CPU 21 directly shifts to Step S113 without performing Step S112.

In Step S113, the CPU 21 suspends the printing operation of the preceding job currently performed. Successively, the CPU 21 commences the printing operation of the inputted job (Step S114), and monitors the finalization of the inputted job (completion of the job implementation) concerned (Step S115; repetition loop of No). When the printing operation of the inputted job has completed (Step S115; Yes), the CPU 21 conducts the finalization processing of the inputted job (Step S116), and resumes the other printing operation of the preceding job, which has been temporarily suspended, (Step S117), and then, returns to the main routine (RETURN).

As described in the foregoing, in the printing apparatus 20 embodied in the present invention, the operation for determining whether or not the interruption printing of the second print job should be allowed in mid course of implementing the preceding first print job (interruption availability determining operation) is performed on the basis of the complex factors constituted by the printing times to be consumed in the first print job and the second print job (quantitative factors) and the priority degrees of the first print job and the second print job (qualitative factors). Accordingly, it becomes possible not only to perform such an interruption availability determining operation that makes the beneficial balance, between the first print job serving as the interrupted side and the second print job serving as the interrupting side, appropriate, but also to perform the print controlling operation for optimizing the beneficial balance based on the above-determined result. Therefore, it becomes possible to provide the print controlling method, which makes it possible to improve the usability of the system for the users in both the interrupted side and the interrupting side.

Further, when calculating the printing time, by taking the printing mode that influences the number of paper sheets to be printed and the printing velocity into account, it becomes possible to calculate the concerned time being more accrete than ever. According to the abovementioned feature, it becomes possible to conduct such the interruption availability determining operation and the print controlling operation that make it possible to improve the beneficial balance to a level more appropriate than ever or to optimize the beneficial balance.

Still further, it becomes also possible for the user to utilize the interruption availability determining operation only by conducting the operations same as those for commencing the implementation of the normal job, such as normal operations for commencing the implementation of the normal job from the non-operating status, namely, an operation for depressing the start button 27b of the printing apparatus 20 when commencing the implementation of the copy job, another operation for clicking the OK button displayed on the terminal device 10 when commencing the implementation of the print job, etc. As abovementioned, since any specific operation is not required, it becomes possible to improve the usability of the interruption printing.

Still further, in the case of employing the conventional interruption printing function in which the beneficial balance has not been made to be appropriate, when the abovementioned tow-way use is introduced, there has occurred such a disadvantage that the interruption printing may be automatically implemented by the normal operations, even when the interruption printing is not necessary. On the other hand, according to the printing system embodied in the present invention, since the beneficial balance can be optimized, it becomes possible to conduct the interruption printing having a good usability without generating the abovementioned drawback only by performing simple operations. In addition, once the interruption printing is allowed, the interruption printing is automatically implemented, resulting in improvement of the usability.

Yet further, in the case of the copy job, merely by setting the document onto the automatic document feeder 28 and depressing the start button 27b after inputting the setting items, such as the printing mode, etc., the thickness and the weight of the document concerned is automatically measured so as to calculate the number of document paper sheets, and then, the availability of the interruption printing is determined on the basis of the above-calculated number of document paper sheets and the printing mode. As abovementioned, since the availability of the interruption printing can be speedily determined before reading the document, when it is determined that the interruption printing is unallowable, by quickly receiving the determined result, it becomes possible for the user to swiftly take opposing actions, such as canceling the print job, implementing the concerned print job in another printing apparatus, etc., resulting in improvement of the user's usability.

Second Embodiment

Figure 12:
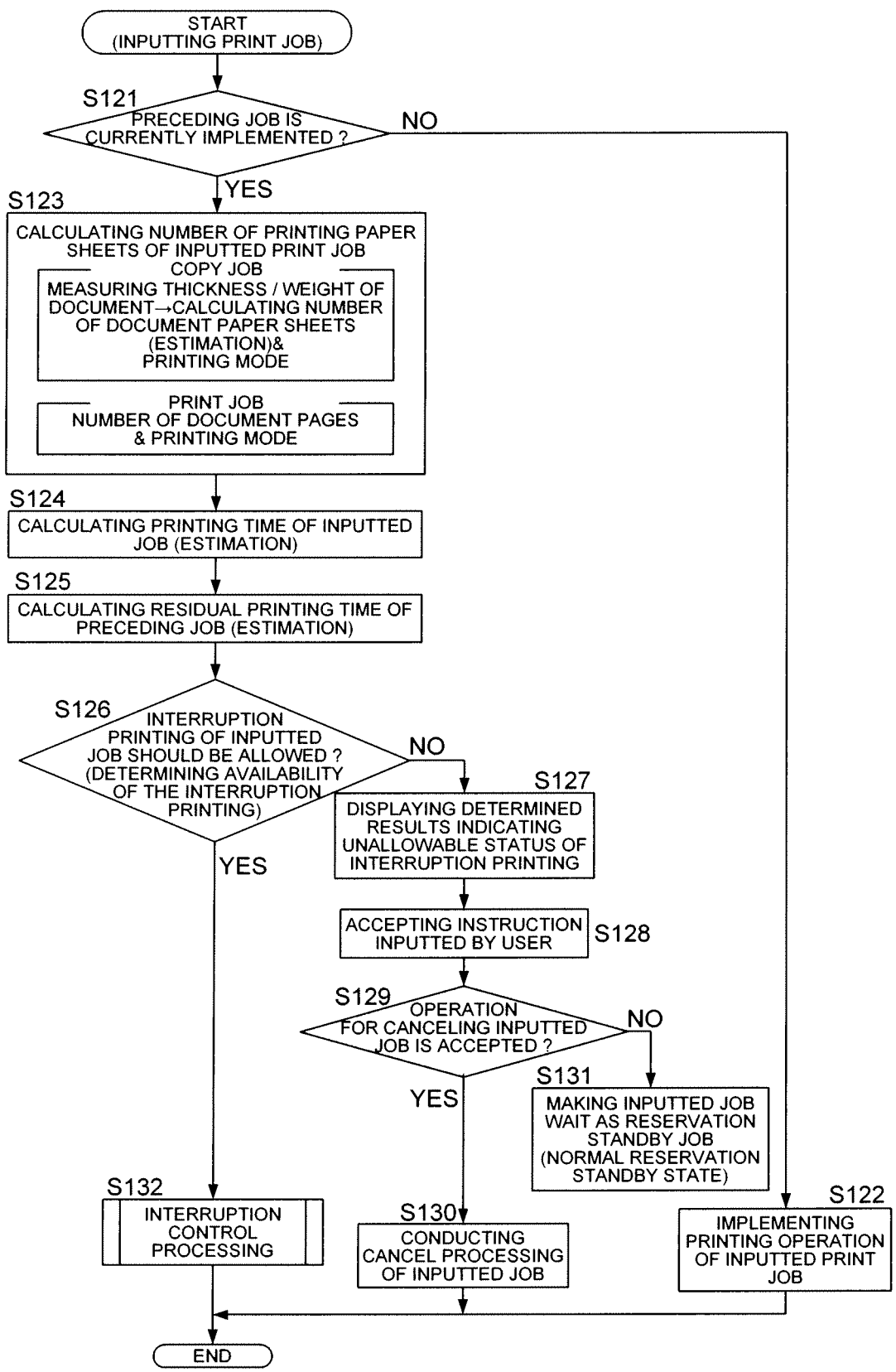
FIG. 12 shows a flowchart indicating a main routine for determining an availability of an interruption printing and controlling the interruption printing, in regard to a second embodiment of the present invention.

The second embodiment is a modified example of the interruption availability determining operation, which has been described as the first embodiment while referring to the flowchart shown in FIG. 10. FIG. 12 shows an operational flow of the other interruption availability determining operation embodied in the present invention as the second embodiment. The second embodiment differs from the first embodiment on the point that, when it is determined that the interruption printing is unallowable, a message thereof is displayed before accepting the cancellation of the concerned job from the user, and the other operations to be conducted in the second embodiment are substantially the same as those in the first embodiment.

The abovementioned different point will be detailed in the following. The CPU 21 of the printing apparatus 20 conducts the operations in Step S121 through Step S126, which are the same as those in Step S101 through Step S106 indicated in the flowchart shown in FIG. 10. When determining that interruption printing is unallowable (Step S126; No), the CPU 21 displays the determined results indicating the unallowable status of the interruption printing concerned and the residual printing time of the preceding job to inquire whether or not the inputted job should be cancelled from the user (Step S127), and accepts the instruction inputted by the user (Step S128).

In the case of the copy job, the CPU 21 displays the determined results on the operation display section 27 of the printing apparatus 20 so as to accept the instruction inputted by the user through the operation display section 27. In the case of the print job, the CPU 21 transmits information in regard to the determined results (the unallowable status of the interruption printing concerned) and the residual printing time of the preceding job to the terminal device 10, so as to makes the display section 16 of the terminal device 10 display them thereon, and accepts the instruction inputted by the user through the display section 16 and the operating section 17.

At that occasion, when accepting the operation for canceling the inputted job concerned from the user (Step S129; Yes), the CPU 21 conducts the cancel processing of the inputted job concerned (Step S130), and finalizes this operational flow (END). For instance, the operation for canceling the inputted job is any one of: the operation for depressing the cancel button 27d of the operation display section 27 in the case of the copy job, the operation for clicking the cancel button displayed on the display section 16 in the case of the print job, etc.

When not accepting the operation for canceling the inputted job concerned from the user (Step S129; No), as well as the first embodiment, the CPU 21 makes the inputted job wait as a reservation standby job (Step S131), so as to implement the inputted job after the implementation of the preceding job has been completed (Step S122), and then, finalizes this operational flow when completing the inputted job concerned (END). On the other hand, when determining that the interruption printing is allowable (Step S126; Yes), as well as the first embodiment, the CPU 21 conducts the operations for controlling the interruption printing indicated by the subroutine (Step S132 (refer to the flowchart shown in FIG. 11)), and then, finalizes this operational flow (END).

As abovementioned, according to the present embodiment, the user, whose interruption printing is not allowed, receives the inquiry for asking whether or not the print job (second print job) instructed by himself should be cancelled, so that the concerned user can instruct his decision in regard to the abovementioned inquiry. Accordingly, it becomes possible for the user to select any one of options including; canceling the print job for which interruption printing is not allowed and making it wait in the normal reservation standby state, resulting in an improvement of the usability. Further, since the user receives a notification in regard to the residual printing time of currently implementing job (first print job), and accordingly, the user can grasp the rough time when the print job instructed by himself (second print job) will be commenced, it becomes easy for the user to determine whether or not the print job for which interruption printing is not allowed should be canceled.

Third Embodiment

Figure 13:
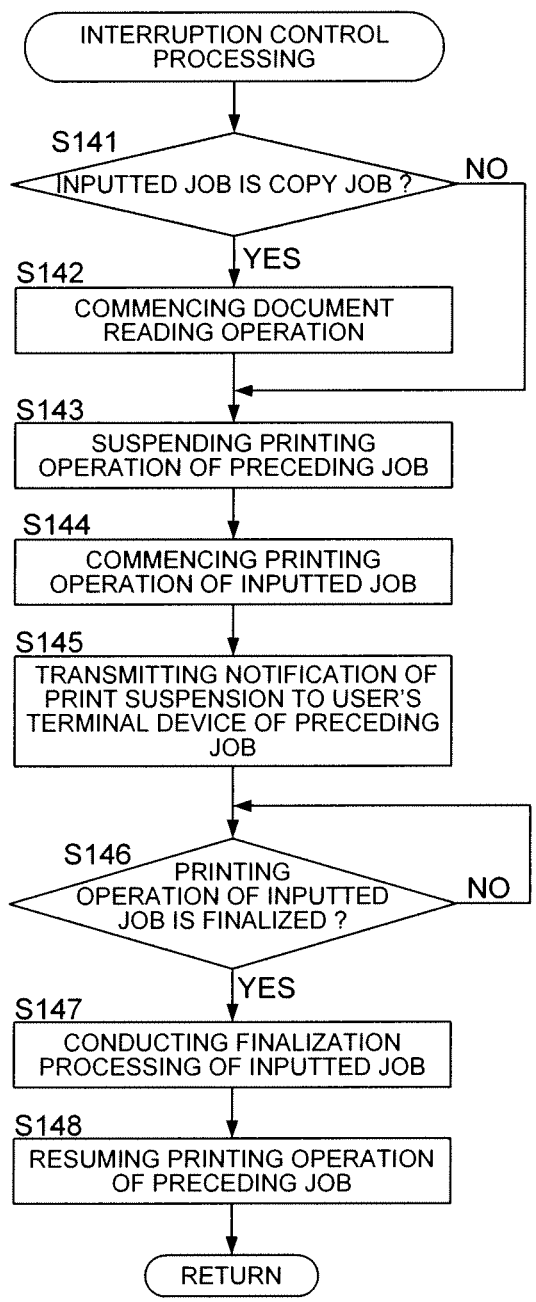
FIG. 13 shows a flowchart indicating a sub routine of a main routine for controlling an interruption printing, in regard to a third embodiment of the present invention.

The third embodiment is another modified example of the interruption availability determining operation, which has been described as the first embodiment while referring to the flowchart shown in FIG. 11. FIG. 13 shows an operational flow of the other interruption availability determining operation embodied in the present invention as the third embodiment. The third embodiment differs from the first embodiment on the point that occurrence of the interruption printing is notified to the interrupted user, and the other operations to be conducted in the third embodiment are substantially the same as those in the first embodiment.

The abovementioned different point will be detailed in the following. The CPU 21 of the printing apparatus 20 conducts the operations in Step S141 through Step S144, which are the same as those in Step S111 through Step S114 indicated in the flowchart shown in FIG. 11. Successively, in Step S145, the CPU 21 transmits an E-mail to the terminal device 10 from which the interrupted user has instructed the preceding print job, in order to notify the interrupted user of a message suggesting that the printing operation, based on the print job currently implemented according to the instruction of the user concerned, is temporarily suspended due to the interruption printing based on the other print job inputted by the interrupting user. Further, it is also applicable that the E-mail message also includes the printing time (estimated value) of the job that commenced the interruption printing. After that, the CPU 21 conducts the operations in Step S146 through Step S148, which are the same as those in Step S115 through Step S117 indicated in the flowchart shown in FIG. 11.

As abovementioned, according to the present embodiment, it becomes possible for the interrupted user to recognize the fact that the preceding print job instructed by himself is currently interrupted, from the contents of the E-mail massage transmitted to the terminal device 10 of his own, and accordingly, it also becomes possible for him to grasp in advance the fact that the completion time of his own print job (first print job) will delay from the previously estimated time. Further, in the case that the E-mail message also includes the printing time of the interrupting job, it becomes possible for the interrupted user to grasp the rough time when the currently suspended print job will be resumed. Accordingly, it becomes easy for the user to conduct the time adjustment for going to the printing apparatus 20 to take out the ejected print products or the like.

Fourth Embodiment

Figure 14:
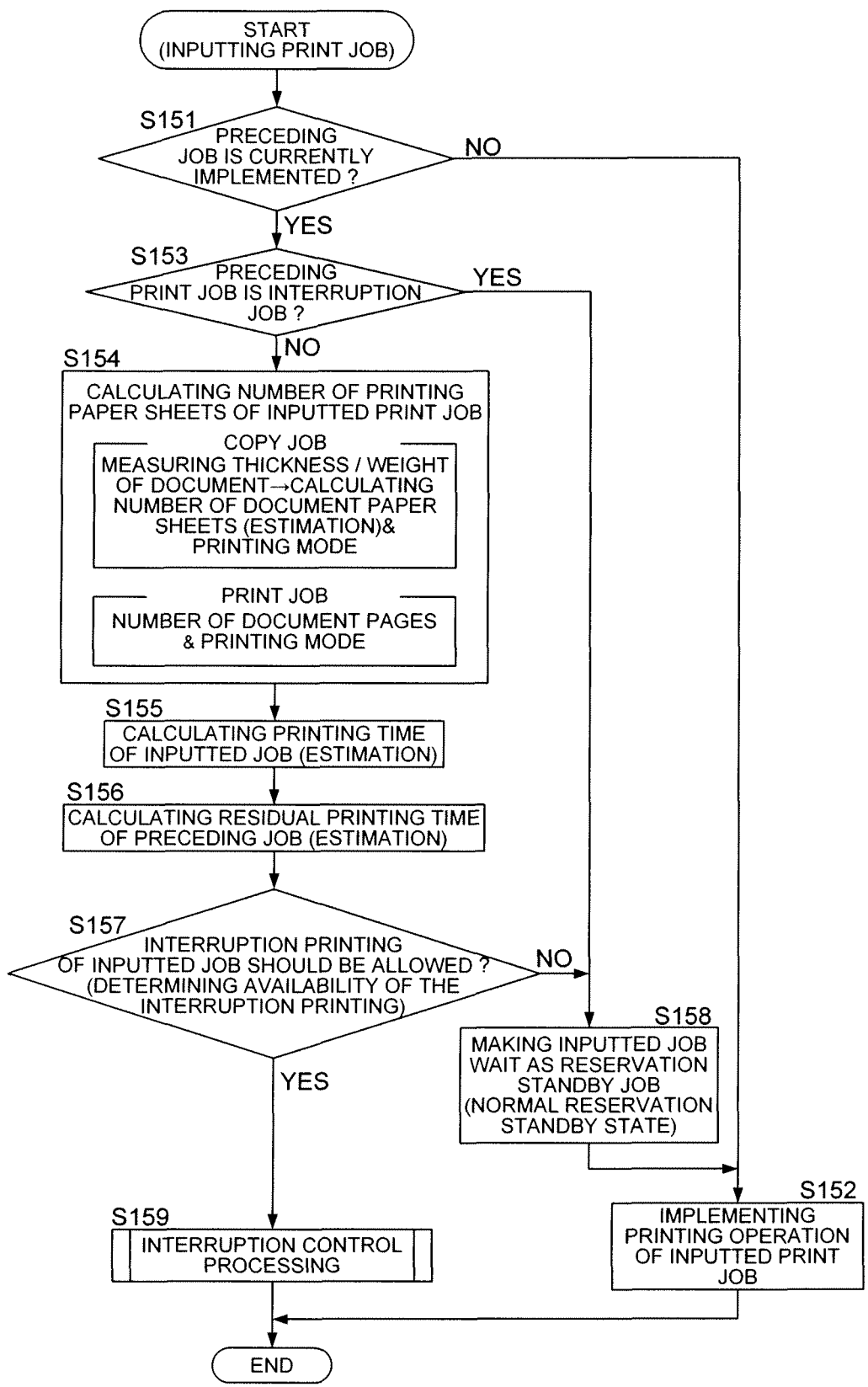
FIG. 14 shows a flowchart indicating a main routine for determining an availability of an interruption printing and controlling the interruption printing, in regard to a fourth embodiment of the present invention.

The fourth embodiment is still another modified example of the interruption availability determining operation, which has been described as the first embodiment while referring to the flowchart shown in FIG. 10. FIG. 14 shows an operational flow of the other interruption availability determining operation embodied in the present invention as the fourth embodiment. The fourth embodiment differs from the first embodiment on the point that, when the preceding print job currently implemented is the interruption job, the interruption printing of the inputted job is not accepted, and the other operations to be conducted in the fourth embodiment are substantially the same as those in the first embodiment.

The abovementioned different point will be detailed in the following. When a print job is inputted (START) and a preceding print job is currently in mid course of its implementation (Step S151; Yes), the CPU 21 of the printing apparatus 20 determines whether or not the preceding print job is the interruption job (Step S153). When determining that the preceding print job is not the interruption job (Step S153; No), the CPU 21 conducts the operations in Step S154 through Step S157 and Step S159, which are the same as those in Step S103 through Step S106 and Step S108, indicated in the flowchart shown in FIG. 10.

When determining that the preceding print job is the interruption job (Step S153; Yes), the CPU 21 does not accept the interruption printing of the print job currently inputted and makes the concerned print job wait as the reservation standby job (Step S158). Then, the CPU 21 completes the printing operation of the preceding print job currently serving as the interruption printing, and then, resumes and completes the printing operation of the other preceding print job that is suspended due to the implementation of the interruption printing. After that, the CPU 21 implements the inputted job waited as the reservation standby job (Step S152) and finalizes this operational flow (END).

As abovementioned, the present embodiment is so constituted that it is prohibited to accept such a duplicated interruption printing that, in mid course of implementing the interruption printing based on the certain print job (interruption job), further implements the interruption printing based on the other print job. According to this feature, it becomes possible not only to prevent the interruption controlling operation from complicating, but also to avoid such a drawback that mixture and/or missing of print products are liable to occur, due to emergence of a plurality of print products, ejecting operations of which are temporarily suspended.

As described in the foregoing, the embodiments of present invention have been detailed, referring to the drawings. However, the scope of the present invention is not limited to the aforementioned embodiments. Modifications and additions made by a skilled person without departing from the spirit and scope of the invention shall be included in the scope of the present invention.

For instance, although the four parameters, respectively corresponding to the residual printing time and the priority degree of the first print job (preceding print job), and the printing time and the priority degree of the second print job (inputted print job), are employed for the operation for determining the availability of the interruption printing, it is also applicable that, with respect to the priority degree, any one of the priority degrees of the first print job and the second print job is employed for the above-purpose.

Further, in the present embodiments, when the second print job is the copy job, the number of document paper sheets is estimated by measuring the thickness and the weight of the document (bunch of document paper sheets), so as to calculate the printing time. However, it is also applicable that the number of document paper sheets is found by simply counting the document paper sheets while reading them without conducting the abovementioned measurement.

Still further, for instance, in such the case that the printing operation is commenced after the operation for reading all of the document paper sheets has been completed, it is applicable that the total sum of the time interval, which is fund by adding the printing time of the copy job in the interrupting side (second print job) and its reading time to each other, is regarded as the printing time (total printing time) of the job concerned, so as to conduct the operation for determining the availability of the interruption printing and the controlling operations thereof. Alternatively, it is also applicable that the time interval, which is fund by subtracting the reading time of the copy job in the interrupting side (second print job) from the residual printing time of the first print job in the interrupted side, is regarded as the printing time (total printing time) of the first print job, so as to conduct the operation for determining the availability of the interruption printing and the controlling operations thereof. Further, when the printing operation is commenced in mid course of reading the document paper sheets (for instance, after the operation for reading both sides of the first paper sheet has completed), it is also applicable that the print commencement time interval, from the time point when commencing the reading operation of the document to the other time point when actually commencing the printing operation, is calculated, and then, the time interval, which is fund by adding the printing time of the copy job in the interrupting side (second print job) and its print commencement time interval to each other, is regarded as the printing time (total printing time) of the job concerned, so as to conduct the operation for determining the availability of the interruption printing and the controlling operations thereof.

Still further, although each of the embodiments described in the foregoing has such the configuration that the printing apparatus 20 is provided with the function as the print control apparatus, which automatically conducts the operation for determining the availability of the interruption printing and the controlling operations thereof, the scope of the configuration of the print control apparatus, embodied in the present invention, is not limited to those configured in the aforementioned embodiments. It is also applicable that a combination of the printing apparatus 20 and a server 80, etc., coupled to the network 2 and exemplified in FIG. 1, cooperatively serves as the print control apparatus. For instance, it is applicable that the printing apparatus 20 is in charge of the printing operation to be conducted by the printer section 30, the feeding operation to be conducted by the automatic document feeder 28 and the document reading operation to be conducted by the scanner section 29, while the server 80 is in charge of the operation for determining the availability of the interruption printing and the controlling operations thereof.

Yet further, the printing apparatus, embodied in the present invention, is available not only for the MFP (Multi Function Peripheral) described in the embodiments of the present invention, but also for any other printing apparatuses, such as a copier, a printer, etc.

According to the present invention, it becomes possible to conduct the print controlling operations in the interruption printing, so as to optimize the beneficial balance between the interrupting side and the interrupted side. Accordingly, it becomes possible to provide the print controlling operations having high usability for both of the interrupting and interrupted users.

While the preferred embodiments of the present invention have been described using specific term, such description is for illustrative purpose only, and it is to be understood that changes and variations may be made without departing from the spirit and scope of the appended claims.

What is claimed is:

1. A print control apparatus that controls an interruption printing operation, to be performed by a printing section, for temporarily suspending a first print job that is currently in midcourse of its implementation so as to implement a second print job in an interruption printing mode, comprising:

a job-status parameter acquiring section to acquire job-status parameters including a residual printing time of the first print job, a printing time of the second print job, a first priority degree representing an implementation priority of the first print job and a second priority degree representing another implementation priority of the second print job; and a controlling section to determine whether or not the interruption printing operation should be allowed, namely, an availability of the interruption printing operation, based on the residual printing time of the first print job, the printing time of the second print job, and at least one of the first priority degree and the second priority degree;

wherein the controlling section calculates an interruption allowable time, based on the residual printing time of the first print job and said at least one of the first priority degree and the second priority degree; and wherein, when the printing time of the second print job is equal to or shorter than the interruption allowable time calculated by the controlling section, the controlling section determines that the interruption printing operation should be allowed.

2. The print control apparatus of claim 1, wherein, during implementing a print job, when accepting an inputting operation being same as that for commencing an implementation of the print job during a standby status of the printing section, the controlling section conducts an operation for determining the availability of the interruption printing operation.

3. The print control apparatus of claim 1, wherein, when determining that the interruption printing operation should be allowed, the controlling section controls the printing section to temporarily suspend the first print job so as to implement the second print job in the interruption printing mode.

4. The print control apparatus of claim 1, further comprising: a user-identification information acquiring section to acquire user identification information in regard to a second user who instructs the implementation of the second print job; and a communication section to communicate with a terminal device of the second user;

wherein, when determining that the interruption printing operation should not be allowed, the controlling section identifies the second user who instructs the implementation of the second print job, based on the user identification information acquired by the user-identification information acquiring section, so as to notify the second user of the residual printing time of the first print job.

5. The print control apparatus of claim 1, wherein, when the first print job is such a print job that is in midcourse of implementing the interruption printing operation, the controlling section bans the printing section from accepting a further interruption printing operation based on the second print job.

6. The print control apparatus of claim 1, wherein, when the controlling section calculates the interruption allowable time based on both of the first priority degree and the second priority degree, each of the first priority degree and the second priority degree is established in a stepwise manner.

7. A print control apparatus that controls an interruption printing operation, to be performed by a printing section, for temporarily suspending a first print job that is currently in midcourse of its implementation so as to implement a second print job in an interruption printing mode, comprising:

a job-status parameter acquiring section to acquire job-status parameters including a residual printing time of the first print job, a printing time of the second print job, a first priority degree representing an implementation priority of the first print job and a second priority degree representing another implementation priority of the second print job;

a controlling section to determine whether or not the interruption printing operation should be allowed, namely, an availability of the interruption printing operation, based on the residual printing time of the first print job, the printing time of the second print job, and at least one of the first priority degree and the second priority degree;

a user-identification information acquiring section to acquire user identification information in regard to a first user who instructs implementation of the first print job; and a communication section to communicate with a terminal device of the first user;

wherein, when determining that the interruption printing operation should be allowed, the controlling section controls the printing section to temporarily suspend the first print job so as to implement the second print job in the interruption printing mode; and wherein, when implementing the interruption printing operation, the controlling section identifies the first user who instructs the implementation of the first print job, based on the user identification information acquired by the user-identification information acquiring section, so as to notify the first user of a fact that the first print job, being currently in midcourse of its implementation, is temporarily suspended due to the interruption printing operation.

8. The print control apparatus of claim 7,
wherein, when the controlling section calculates interruption allowable time based on both of the first priority degree and the second priority degree, each of the first priority degree and the second priority degree is established in a stepwise manner.

9. A print control apparatus that controls an interruption printing operation, to be performed by a printing section, for temporarily suspending a first print job that is currently in midcourse of its implementation so as to implement a second print job in an interruption printing mode, comprising:

a job-status parameter acquiring section to acquire job-status parameters including a residual printing time of the first print job, a printing time of the second print job, a first priority degree representing an implementation priority of the first print job and a second priority degree representing another implementation priority of the second print job;

a controlling section to determine whether or not the interruption printing operation should be allowed, namely, an availability of the interruption printing operation, based on the residual printing time of the first print job, the printing time of the second print job, and at least one of the first priority degree and the second priority degree;

wherein, when determining that the interruption printing operation should not be allowed, the controlling section inquires whether or not the second print job should be cancelled, from a second user who instructs implementation of the second print job, and accepts an instruction issued by the second user.

10. The print control apparatus of claim 9,
wherein, when the controlling section calculates an interruption allowable time based on both of the first priority degree and the second priority degree, each of the first priority degree and the second priority degree is established in a stepwise manner.

11. A printing apparatus, comprising:
a printing section to perform an interruption printing operation for temporarily suspending a first print job that is currently in midcourse of its implementation so as to implement a second print job in an interruption printing mode;

a job-status parameter acquiring section to acquire job-status parameters including a residual printing time of the first print job, a printing time of the second print job, a first priority degree representing an implementation priority of the first print job and a second priority degree representing another implementation priority of the second print job; and a controlling section to determine whether or not the interruption printing operation should be allowed, namely, an availability of the interruption printing operation, based on the residual printing time of the first print job, the printing time of the second print job, and at least one of the first priority degree and the second priority degree;

wherein the controlling section controls a printing operation for recording an image onto a recording paper sheet based on image data representing the image, the printing operation is to be performed by the printing section; and wherein the controlling section calculates an interruption allowable time, based on the residual printing time of the first print job and said at least one of the first priority degree and the second priority degree; and wherein, when the printing time of the second print job is equal to or shorter than the interruption allowable time calculated by the controlling section, the controlling section determines that the interruption printing operation should be allowed.

12. The printing apparatus of claim 11,
wherein, during implementing a print job, when accepting an inputting operation being same as that for commencing an implementation of the print job during a standby status of the printing section, the controlling section conducts an operation for determining the availability of the interruption printing operation.

13. The printing apparatus of claim 11,
wherein, when determining that the interruption printing operation should be allowed, the controlling section controls the printing section to temporarily suspend the first print job so as to implement the second print job in the interruption printing mode.

14. The printing apparatus of claim 11, further comprising:
a user-identification information acquiring section to acquire user identification information in regard to a second user who instructs implementation of the second print job; and a communication section to communicate with a terminal device of the second user;

wherein, when determining that the interruption printing operation should not be allowed, the controlling section identifies the second user who instructs the implementation of the second print job, based on the user identification information acquired by the user-identification information acquiring section, so as to notify the second user of the residual printing time of the first print job.

15. The printing apparatus of claim 11,
wherein, when the first print job is such a print job that is in midcourse of implementing the interruption printing operation, the controlling section bans the printing section from accepting a further interruption printing operation based on the second print job.

16. The printing apparatus of claim 11, further comprising:
a document reading section to read a document so as to acquire image data; and
a measuring section to measure at least one of a thickness and a weight of the document placed on the document reading section so as to acquire measurement information of the document;
wherein, based on a number of document paper sheets estimated from the measurement information acquired by the measuring section, the controlling section calculates the printing time of the second print job in which the printing section prints the image, based on the image data of the document acquired by the document reading section, onto the recording paper sheet.

17. The printing apparatus of claim 16,
wherein the controlling section calculates the printing time of the second print job, based on a print condition established in regard to the second print job, in addition to the number of document paper sheets.

18. The printing apparatus of claim 11,
wherein, when the controlling section calculates the interruption allowable time based on both of the first priority degree and the second priority degree, each of the first priority degree and the second priority degree is established in a stepwise manner.

19. A printing apparatus, comprising:
a printing section to perform an interruption printing operation for temporarily suspending a first print iob that is currently in midcourse of its implementation so as to implement a second print job in an interruption printing mode;
a job-status parameter acquiring section to acquire job-status parameters including a residual printing time of the first print job, a printing time of the second print job, a first priority degree representing an implementation priority of the first print job and a second priority degree representing another implementation priority of the second print job;
a controlling section to determine whether or not the interruption printing operation should be allowed, namely, an availability of the interruption printing operation, based on the residual printing time of the first print job, the printing time of the second print job, and at least one of the first priority degree and the second priority degree;
a user-identification information acquiring section to acquire user identification information in regard to a first user who instructs implementation of the first print job; and
a communication section to communicate with a terminal device of the first user;
wherein the controlling section controls a printing operation for recording an image onto a recording paper sheet based on image data representing the image, the printing operation is to be performed by the printing section; and
wherein, when determining that the interruption printing operation should be allowed, the controlling section controls the printing section to temporarily suspend the first print job so as to implement the second print job in the interruption printing mode; and
wherein, when implementing the interruption printing operation, the controlling section identifies the first user who instructs the implementation of the first print job, based on the user identification information acquired by the user-identification information acquiring section, so as to notify the first user of a fact that the first print job, being currently in midcourse of its implementation, is temporarily suspended due to the interruption printing operation.

20. The printing apparatus of claim 19,
wherein, when the controlling section calculates an interruption allowable time based on both of the first priority degree and the second priority degree, each of the first priority degree and the second priority degree is established in a stepwise manner.

21. A printing apparatus, comprising:
a printing section to perform an interruption printing operation for temporarily suspending a first print job that is currently in midcourse of its implementation so as to implement a second print job in an interruption printing mode;
a job-status parameter acquiring section to acquire job-status parameters including a residual printing time of the first print job, a printing time of the second print job, a first priority degree representing an implementation priority of the first print job and a second priority degree representing another implementation priority of the second print job; and
a controlling section to determine whether or not the interruption printing operation should be allowed, namely, an availability of the interruption printing operation, based on the residual printing time of the first print job, the printing time of the second print job, and at least one of the first priority degree and the second priority degree;
wherein the controlling section controls a printing operation for recording an image onto a recording paper sheet based on image data representing the image, the printing operation is to be performed by the printing section; and
wherein, when determining that the interruption printing operation should not be allowed, the controlling section inquires whether or not the second print job should be cancelled, from a second user who instructs implementation of the second print job, and accepts an instruction issued by the second user.

22. The printing apparatus of claim 21,
wherein, when the controlling section calculates an interruption allowable time based on both of the first priority degree and the second priority degree, each of the first priority degree and the second priority degree is established in a stepwise manner.

* * * * *